(12) United States Patent
Warren et al.

(10) Patent No.: US 9,026,254 B2
(45) Date of Patent: May 5, 2015

(54) STRATEGIC REDUCTION OF POWER USAGE IN MULTI-SENSING, WIRELESSLY COMMUNICATING LEARNING THERMOSTAT

(75) Inventors: Daniel Adam Warren, San Francisco, CA (US); Grant M. Erickson, Sunnyvale, CA (US); Andrea Mucignat, San Francisco, CA (US); Edwin H. Satterthwaite, Jr., Palo Alto, CA (US); Joseph Adam Ruff, San Jose, CA (US); Joseph E. Palmer, San Jose, CA (US); Shigefumi Honjo, Santa Cruz, CA (US)

(73) Assignee: Google Inc., Mountain View, CA (US)

( * ) Notice: Subject to any disclaimer, the term of this patent is extended or adjusted under 35 U.S.C. 154(b) by 401 days.

(21) Appl. No.: 13/267,877

(22) Filed: Oct. 6, 2011

(65) Prior Publication Data
US 2012/0179300 A1 Jul. 12, 2012

Related U.S. Application Data

(60) Provisional application No. 61/415,771, filed on Nov. 19, 2010, provisional application No. 61/429,093, filed on Dec. 31, 2010.

(51) Int. Cl.
*G05B 9/02* (2006.01)
*G01M 1/38* (2006.01)
(Continued)

(52) U.S. Cl.
CPC ............ *G05D 23/19* (2013.01); *F24F 11/0012* (2013.01); *F24F 2011/0068* (2013.01); *F24F 2011/0073* (2013.01); *G05D 23/1902* (2013.01); *G05D 23/1917* (2013.01); *F24D 19/10* (2013.01)

(58) Field of Classification Search
CPC ............... G05D 23/00; Y02B 60/1292; G01R 19/16542; G01R 31/36; G01R 31/3651; G01R 31/3693; G01R 2031/36; G05B 2219/24136; G06F 1/3212
USPC ........ 700/17, 276, 79; 702/63, 64; 340/636.1, 340/636.13, 636.15
See application file for complete search history.

(56) References Cited

U.S. PATENT DOCUMENTS 3,640,455 A 2/1972 Romanelli
3,991,357 A 11/1976 Kaminski
(Continued)

FOREIGN PATENT DOCUMENTS

CA 2202008 2/2000
EP 207295 1/1987
(Continued)

OTHER PUBLICATIONS
GB 2294828 A; Cottrell et al., published on Aug. 5, 1996. 19 pages.*
(Continued)

*Primary Examiner* — Ronald Hartman, Jr.
(74) *Attorney, Agent, or Firm* — Kilpatrick Townsend & Stockton LLP

(57) ABSTRACT

In a multi-sensing, wirelessly communicating learning thermostat that uses power-harvesting to charge an internal battery, methods are disclosed for ensuring that the battery does not become depleted or damaged while at the same time ensuring selected levels of thermostat functionality. Battery charge status is monitored to determine whether the present rate of power usage needs to be stemmed. If the present rate of power usage needs to be stemmed, then a progression of performance levels and/or functionalities are scaled back according to a predetermined progressive power conservation algorithm. In a less preferred embodiment, there is a simple progressive shutdown of functionalities turned off in sequence until the desired amount of discharge stemming is reached. Battery charge preservation measures are also described for cases when an interruption of external supply power used to recharge the battery is detected.

31 Claims, 11 Drawing Sheets

(51) Int. Cl.
   G05B 13/00        (2006.01)
   G05B 15/00        (2006.01)
   G05D 23/00        (2006.01)
   G01R 31/36        (2006.01)
   G01R 19/00        (2006.01)
   G08B 21/00        (2006.01)
   G05D 23/19        (2006.01)
   F24F 11/00        (2006.01)
   F24D 19/10        (2006.01)

(56)             References Cited

U.S. PATENT DOCUMENTS

| | | | |
|---|---|---|---|
| 4,157,506 A | 6/1979 | Spencer | |
| 4,183,290 A | 1/1980 | Kucharczyk | |
| 4,223,831 A | 9/1980 | Szarka | |
| 4,308,991 A | 1/1982 | Peinetti et al. | |
| 4,335,847 A | 6/1982 | Levine | |
| 4,408,711 A | 10/1983 | Levine | |
| 4,506,827 A * | 3/1985 | Jamieson et al. | 236/46 R |
| 4,615,380 A | 10/1986 | Beckey | |
| 4,646,964 A | 3/1987 | Parker et al. | |
| 4,656,835 A | 4/1987 | Kidder et al. | |
| 4,657,179 A | 4/1987 | Aggers et al. | |
| 4,674,027 A | 6/1987 | Beckey | |
| 4,685,614 A | 8/1987 | Levine | |
| 4,695,246 A | 9/1987 | Beilfuss et al. | |
| 4,742,475 A | 5/1988 | Kaiser et al. | |
| 4,751,961 A | 6/1988 | Levine et al. | |
| 4,842,510 A | 6/1989 | Grunden et al. | |
| 4,872,828 A | 10/1989 | Mierzwinski et al. | |
| 4,881,686 A * | 11/1989 | Mehta | 236/46 R |
| 4,897,798 A | 1/1990 | Cler | |
| 4,948,040 A | 8/1990 | Kobayashi et al. | |
| 4,948,044 A | 8/1990 | Cacciatore | |
| 4,955,806 A | 9/1990 | Grunden et al. | |
| 5,088,645 A | 2/1992 | Bell | |
| 5,127,464 A | 7/1992 | Butler et al. | |
| 5,158,477 A | 10/1992 | Testa et al. | |
| 5,175,439 A | 12/1992 | Haerer et al. | |
| 5,211,332 A | 5/1993 | Adams | |
| 5,224,648 A | 7/1993 | Simon et al. | |
| 5,226,591 A * | 7/1993 | Ratz | 236/47 |
| 5,240,178 A | 8/1993 | Dewolf et al. | |
| 5,244,146 A | 9/1993 | Jefferson et al. | |
| 5,255,179 A | 10/1993 | Zekan et al. | |
| 5,347,982 A | 9/1994 | Binzer et al. | |
| 5,348,078 A * | 9/1994 | Dushane et al. | 165/209 |
| 5,352,930 A | 10/1994 | Ratz | |
| 5,381,950 A | 1/1995 | Aldridge | |
| 5,395,042 A | 3/1995 | Riley et al. | |
| 5,476,221 A | 12/1995 | Seymour | |
| 5,499,196 A | 3/1996 | Pacheco | |
| 5,506,569 A | 4/1996 | Rowlette | |
| 5,533,668 A | 7/1996 | Erikson | |
| 5,544,036 A | 8/1996 | Brown, Jr. et al. | |
| 5,555,927 A | 9/1996 | Shah | |
| 5,570,837 A | 11/1996 | Brown et al. | |
| 5,595,342 A | 1/1997 | McNair et al. | |
| 5,611,484 A | 3/1997 | Uhrich | |
| 5,635,896 A | 6/1997 | Tinsley et al. | |
| 5,644,173 A | 7/1997 | Elliason et al. | |
| 5,697,552 A | 12/1997 | McHugh et al. | |
| 5,736,795 A | 4/1998 | Zuehlke et al. | |
| 5,761,083 A | 6/1998 | Brown, Jr. et al. | |
| 5,802,467 A | 9/1998 | Salazar et al. | |
| 5,808,294 A | 9/1998 | Neumann | |
| 5,839,654 A | 11/1998 | Weber | |
| 5,902,183 A | 5/1999 | D'Souza | |
| 5,903,139 A | 5/1999 | Kompelien | |
| 5,909,378 A | 6/1999 | De Milleville | |
| 5,918,474 A | 7/1999 | Khanpara et al. | |
| 5,926,776 A | 7/1999 | Glorioso et al. | |
| 5,977,964 A | 11/1999 | Williams et al. | |
| 6,060,719 A | 5/2000 | DiTucci et al. | |
| 6,062,482 A | 5/2000 | Gauthier et al. | |
| 6,066,843 A | 5/2000 | Scheremeta | |
| 6,084,518 A | 7/2000 | Jamieson | |
| 6,095,427 A | 8/2000 | Hoium et al. | |
| 6,098,893 A | 8/2000 | Berglund et al. | |
| 6,116,512 A | 9/2000 | Dushane et al. | |
| 6,216,956 B1 | 4/2001 | Ehlers et al. | |
| 6,222,719 B1 | 4/2001 | Kadah | |
| 6,275,160 B1 | 8/2001 | Ha | |
| 6,349,883 B1 | 2/2002 | Simmons et al. | |
| 6,356,038 B2 | 3/2002 | Bishel | |
| 6,356,204 B1 | 3/2002 | Guindi et al. | |
| 6,370,894 B1 | 4/2002 | Thompson et al. | |
| 6,385,510 B1 | 5/2002 | Hoog et al. | |
| 6,415,205 B1 | 7/2002 | Myron et al. | |
| 6,453,687 B2 | 9/2002 | Sharood et al. | |
| 6,478,233 B1 | 11/2002 | Shah | |
| 6,509,838 B1 | 1/2003 | Payne et al. | |
| 6,513,723 B1 | 2/2003 | Mueller et al. | |
| 6,519,509 B1 | 2/2003 | Nierlich et al. | |
| 6,566,768 B2 | 5/2003 | Zimmerman et al. | |
| 6,574,581 B1 | 6/2003 | Bohrer et al. | |
| 6,604,023 B1 | 8/2003 | Brown et al. | |
| 6,619,055 B1 | 9/2003 | Addy | |
| 6,619,555 B2 | 9/2003 | Rosen | |
| 6,622,115 B1 | 9/2003 | Brown et al. | |
| 6,622,925 B2 | 9/2003 | Carner et al. | |
| 6,645,066 B2 | 11/2003 | Gutta et al. | |
| 6,657,418 B2 | 12/2003 | Atherton | |
| 6,743,010 B2 | 6/2004 | Bridgeman et al. | |
| 6,769,482 B2 | 8/2004 | Wagner et al. | |
| 6,794,771 B2 | 9/2004 | Orloff | |
| 6,798,341 B1 | 9/2004 | Eckel et al. | |
| 6,851,621 B1 | 2/2005 | Wacker et al. | |
| 6,886,754 B2 * | 5/2005 | Smith et al. | 236/10 |
| 6,891,838 B1 | 5/2005 | Petite et al. | |
| 6,909,921 B1 | 6/2005 | Bilger | |
| 6,975,958 B2 | 12/2005 | Bohrer et al. | |
| 6,983,889 B2 | 1/2006 | Alles | |
| 6,990,821 B2 | 1/2006 | Singh et al. | |
| 6,997,390 B2 | 2/2006 | Alles | |
| 7,024,336 B2 | 4/2006 | Salsbury et al. | |
| 7,055,759 B2 | 6/2006 | Wacker et al. | |
| 7,135,965 B2 | 11/2006 | Chapman, Jr. et al. | |
| 7,149,727 B1 | 12/2006 | Nicholls et al. | |
| 7,149,729 B2 | 12/2006 | Kaasten et al. | |
| 7,156,316 B2 | 1/2007 | Kates | |
| 7,168,627 B2 | 1/2007 | Kates | |
| 7,188,482 B2 | 3/2007 | Sadegh et al. | |
| 7,200,467 B2 | 4/2007 | Schanin et al. | |
| 7,274,975 B2 | 9/2007 | Miller | |
| 7,289,887 B2 | 10/2007 | Rodgers | |
| 7,360,370 B2 | 4/2008 | Shah et al. | |
| 7,379,791 B2 | 5/2008 | Tamarkin et al. | |
| RE40,437 E | 7/2008 | Rosen | |
| 7,434,742 B2 | 10/2008 | Mueller et al. | |
| 7,460,690 B2 | 12/2008 | Cohen et al. | |
| 7,469,550 B2 | 12/2008 | Chapman, Jr. et al. | |
| 7,476,988 B2 | 1/2009 | Mulhouse et al. | |
| 7,510,126 B2 | 3/2009 | Rossi et al. | |
| 7,537,171 B2 | 5/2009 | Mueller et al. | |
| 7,558,648 B2 | 7/2009 | Hoglund et al. | |
| 7,571,865 B2 | 8/2009 | Nicodem et al. | |
| 7,605,714 B2 | 10/2009 | Thompson et al. | |
| 7,644,869 B2 | 1/2010 | Hoglund et al. | |
| 7,702,424 B2 | 4/2010 | Cannon et al. | |
| 7,703,694 B2 | 4/2010 | Mueller et al. | |
| D614,976 S | 5/2010 | Skafdrup et al. | |
| 7,746,242 B2 * | 6/2010 | Schwendinger et al. | 340/636.19 |
| 7,755,220 B2 | 7/2010 | Sorg et al. | |
| 7,784,704 B2 | 8/2010 | Harter | |
| 7,802,618 B2 | 9/2010 | Simon et al. | |
| 7,832,465 B2 | 11/2010 | Zou et al. | |
| 7,837,128 B2 | 11/2010 | Helt et al. | |
| 7,847,681 B2 | 12/2010 | Singhal et al. | |
| 7,848,900 B2 | 12/2010 | Steinberg et al. | |
| 7,849,698 B2 | 12/2010 | Harrod et al. | |
| 7,854,389 B2 | 12/2010 | Ahmed | |
| 7,904,209 B2 | 3/2011 | Podgorny et al. | |

(56) References Cited

U.S. PATENT DOCUMENTS

| | | |
|---|---|---|
| 7,904,830 B2 | 3/2011 | Hoglund et al. |
| 8,010,237 B2 | 8/2011 | Cheung et al. |
| 8,019,567 B2 | 9/2011 | Steinberg et al. |
| 8,037,022 B2 | 10/2011 | Rahman et al. |
| 8,090,477 B1 | 1/2012 | Steinberg |
| 8,091,375 B2 | 1/2012 | Crawford |
| 8,131,497 B2 | 3/2012 | Steinberg et al. |
| 8,174,381 B2 | 5/2012 | Imes et al. |
| 8,180,492 B2 | 5/2012 | Steinberg |
| 8,219,249 B2 | 7/2012 | Harrod et al. |
| 8,265,798 B2 | 9/2012 | Imes |
| 8,415,829 B2 | 4/2013 | Di Cristofaro |
| 8,740,101 B2 * | 6/2014 | Leen et al. ............... 236/51 |
| 2002/0074865 A1 | 6/2002 | Zimmerman et al. |
| 2003/0037555 A1 | 2/2003 | Street et al. |
| 2003/0064335 A1 | 4/2003 | Canon |
| 2003/0090243 A1 | 5/2003 | Atherton |
| 2003/0231001 A1 | 12/2003 | Bruning |
| 2004/0120084 A1 | 6/2004 | Readio et al. |
| 2004/0209209 A1 | 10/2004 | Chodacki et al. |
| 2004/0245349 A1 | 12/2004 | Smith |
| 2004/0249479 A1 | 12/2004 | Shorrock |
| 2005/0043907 A1 | 2/2005 | Eckel et al. |
| 2005/0090915 A1 | 4/2005 | Geiwitz |
| 2005/0128067 A1 | 6/2005 | Zakrewski |
| 2005/0150968 A1 | 7/2005 | Shearer |
| 2005/0189429 A1 | 9/2005 | Breeden |
| 2005/0192915 A1 | 9/2005 | Ahmed et al. |
| 2005/0194455 A1 | 9/2005 | Alles |
| 2005/0194456 A1 | 9/2005 | Tessier et al. |
| 2005/0270151 A1 | 12/2005 | Winick |
| 2005/0280421 A1 | 12/2005 | Yomoda et al. |
| 2006/0017581 A1 | 1/2006 | Schwendinger et al. |
| 2006/0105697 A1 | 5/2006 | Aronstam et al. |
| 2006/0124759 A1 | 6/2006 | Rossi et al. |
| 2006/0147003 A1 | 7/2006 | Archacki et al. |
| 2006/0149395 A1 | 7/2006 | Archacki et al. |
| 2006/0186214 A1 | 8/2006 | Simon et al. |
| 2006/0196953 A1 | 9/2006 | Simon et al. |
| 2006/0208099 A1 | 9/2006 | Chapman et al. |
| 2007/0114295 A1 | 5/2007 | Jenkins |
| 2007/0114848 A1 | 5/2007 | Mulhouse et al. |
| 2007/0115902 A1 | 5/2007 | Shamoon et al. |
| 2007/0131787 A1 | 6/2007 | Rossi et al. |
| 2007/0205297 A1 | 9/2007 | Finkam et al. |
| 2007/0228183 A1 | 10/2007 | Kennedy et al. |
| 2007/0241203 A1 * | 10/2007 | Wagner et al. ............ 236/1 C |
| 2007/0296280 A1 | 12/2007 | Sorg et al. |
| 2008/0015740 A1 | 1/2008 | Osann |
| 2008/0015742 A1 | 1/2008 | Kulyk et al. |
| 2008/0099568 A1 | 5/2008 | Nicodem et al. |
| 2008/0128523 A1 | 6/2008 | Hoglund et al. |
| 2008/0147242 A1 | 6/2008 | Roher et al. |
| 2008/0161977 A1 | 7/2008 | Takach et al. |
| 2008/0183335 A1 | 7/2008 | Poth et al. |
| 2008/0185450 A1 | 8/2008 | Kwon et al. |
| 2008/0191045 A1 | 8/2008 | Harter |
| 2008/0273754 A1 | 11/2008 | Hick et al. |
| 2008/0317292 A1 | 12/2008 | Baker et al. |
| 2009/0045263 A1 | 2/2009 | Mueller et al. |
| 2009/0171862 A1 | 7/2009 | Harrod et al. |
| 2009/0194601 A1 | 8/2009 | Flohr |
| 2009/0236433 A1 | 9/2009 | Mueller et al. |
| 2009/0243842 A1 | 10/2009 | Mitchell et al. |
| 2009/0254225 A1 | 10/2009 | Boucher et al. |
| 2009/0259713 A1 | 10/2009 | Blumrich et al. |
| 2009/0261174 A1 | 10/2009 | Butler et al. |
| 2009/0297901 A1 | 12/2009 | Kilian et al. |
| 2009/0327354 A1 | 12/2009 | Resnick et al. |
| 2010/0000239 A1 | 1/2010 | Lifson et al. |
| 2010/0006660 A1 | 1/2010 | Leen et al. |
| 2010/0019051 A1 | 1/2010 | Rosen |
| 2010/0025483 A1 | 2/2010 | Hoeynck et al. |
| 2010/0070084 A1 | 3/2010 | Steinberg et al. |
| 2010/0070086 A1 | 3/2010 | Harrod et al. |
| 2010/0070234 A1 | 3/2010 | Steinberg et al. |
| 2010/0084482 A1 * | 4/2010 | Kennedy et al. ............... 236/51 |
| 2010/0163633 A1 | 7/2010 | Barrett et al. |
| 2010/0167783 A1 | 7/2010 | Alameh et al. |
| 2010/0168924 A1 | 7/2010 | Tessier et al. |
| 2010/0179704 A1 | 7/2010 | Ozog |
| 2010/0211224 A1 | 8/2010 | Keeling et al. |
| 2010/0250009 A1 | 9/2010 | Lifson et al. |
| 2010/0261465 A1 | 10/2010 | Rhoads et al. |
| 2010/0262298 A1 | 10/2010 | Johnson et al. |
| 2010/0262299 A1 | 10/2010 | Cheung et al. |
| 2010/0280667 A1 | 11/2010 | Steinberg |
| 2010/0289643 A1 | 11/2010 | Trundle et al. |
| 2010/0305771 A1 | 12/2010 | Rodgers |
| 2010/0308119 A1 | 12/2010 | Steinberg et al. |
| 2010/0318227 A1 | 12/2010 | Steinberg et al. |
| 2011/0001812 A1 | 1/2011 | Kang et al. |
| 2011/0025257 A1 | 2/2011 | Weng |
| 2011/0046792 A1 | 2/2011 | Imes et al. |
| 2011/0046805 A1 | 2/2011 | Bedros et al. |
| 2011/0046806 A1 | 2/2011 | Nagel et al. |
| 2011/0054699 A1 | 3/2011 | Imes et al. |
| 2011/0077896 A1 | 3/2011 | Steinberg et al. |
| 2011/0151837 A1 | 6/2011 | Winbush, III |
| 2011/0152024 A1 | 6/2011 | Kuehl |
| 2011/0160913 A1 | 6/2011 | Parker et al. |
| 2011/0185895 A1 | 8/2011 | Freen |
| 2011/0253796 A1 | 10/2011 | Posa et al. |
| 2011/0282937 A1 | 11/2011 | Deshpande et al. |
| 2011/0307103 A1 | 12/2011 | Cheung et al. |
| 2011/0307112 A1 | 12/2011 | Barrilleaux |
| 2012/0017611 A1 | 1/2012 | Coffel et al. |
| 2012/0065935 A1 | 3/2012 | Steinberg et al. |
| 2012/0085831 A1 | 4/2012 | Kopp |
| 2012/0101637 A1 | 4/2012 | Imes et al. |
| 2012/0158350 A1 | 6/2012 | Steinberg et al. |
| 2012/0221151 A1 | 8/2012 | Steinberg |
| 2012/0252430 A1 | 10/2012 | Imes et al. |
| 2013/0228633 A1 * | 9/2013 | Toth et al. ............... 236/1 R |

FOREIGN PATENT DOCUMENTS

| | | |
|---|---|---|
| EP | 196069 | 12/1991 |
| EP | 1275037 | 2/2006 |
| GB | 2294828 | 5/1996 |
| JP | 59106311 | 6/1984 |
| JP | 01252850 | 10/1989 |
| JP | 09298780 | 11/1997 |
| JP | 10023565 | 1/1998 |
| WO | 2008054938 | 5/2008 |
| WO | 2013052901 | 4/2013 |

OTHER PUBLICATIONS

Aprilaire Electronic Thermostats Model 8355 User's Manual, Research Products Corporation, Dec. 2000, 16 pages.
Braeburn 5300 Installer Guide, Braeburn Systems, LLC, Dec. 9, 2009, 10 pages.
Braeburn Model 5200, Braeburn Systems, LLC, Jul. 20, 2011, 11 pages.
Ecobee Smart Si Thermostat Installation Manual, Ecobee, Apr. 3, 2012, 40 pages.
Ecobee Smart Si Thermostat User Manual, Ecobee, Apr. 3, 2012, 44 pages.
Ecobee Smart Thermostat Installation Manual, Jun. 29, 2011, 20 pages.
Ecobee Smart Thermostat User Manual, May 11, 2010, 20 pages.
Electric Heat Lock Out on Heat Pumps, Washington State University Extension Energy Program, Apr. 2010, pp. 1-3.
Honeywell Installation Guide FocusPRO TH6000 Series, Honeywell International, Inc., Jan. 5, 2012, 24 pages.
Honeywell Operating Manual FocusPRO TH6000 Series, Honeywell International, Inc., Mar. 25, 2011, 80 pages.
Honeywell Prestige IAQ Product Data 2, Honeywell International, Inc., Jan. 12, 2012, 126 pages.
Honeywell Prestige THX9321 and TXH9421 Product Data, Honeywell International, Inc., 68-0311, Jan. 2012, 126 pages.

(56) References Cited

OTHER PUBLICATIONS

Honeywell Prestige THX9321-9421 Operating Manual, Honeywell International, Inc., Jul. 6, 2011, 120 pages.
Hunter Internet Thermostat Installation Guide, Hunter Fan Co., Aug. 14, 2012, 8 pages.
Introducing the New Smart Si Thermostat, Datasheet [online]. Ecobee, Mar. 2012 [retrieved on Feb. 25, 2013]. Retrieved from the Internet: <URL: https://www.ecobee.com/solutions/home/smart-si/>, Mar. 12, 2012, 4 pages.
Lennox ComfortSense 5000 Owners Guide, Lennox Industries, Inc., Feb. 2008, 32 pages.
Lennox ComfortSense 7000 Owners Guide, Lennox Industries, Inc., May 2009, 15 pages.
Lennox iComfort Manual, Lennox Industries, Inc., Dec. 2010, 20 pages.
Lux PSPU732T Manual, LUX Products Corporation, Jan. 6, 2009, 48 pages.
NetX RP32-WIFI Network Thermostat Consumer Brochure, Network Thermostat, May 2011, 2 pages.
NetX RP32-WIFI Network Thermostat Specification Sheet, Network Thermostat, Feb. 28, 2012, 2 pages.
RobertShaw Product Manual 9620, Maple Chase Company, Jun. 12, 2001, 14 pages.
RobertShaw Product Manual 9825i2, Maple Chase Company, Jul. 17, 2006, 36 pages.
SYSTXCCUIZ01-V Infinity Control Installation Instructions, Carrier Corp, May 31, 2012, 20 pages.
T8611G Chronotherm IV Deluxe Programmable Heat Pump Thermostat Product Data, Honeywell International Inc., Oct. 1997, 24 pages.
TB-PAC, TB-PHP, Base Series Programmable Thermostats, Carrier Corp, May 14, 2012, 8 pages.
The Perfect Climate Comfort Center PC8900A W8900A-C Product Data Sheet, Honeywell International Inc, Apr. 2001, 44 pages.
TP-PAC, TP-PHP, TP-NAC, TP-NHP Performance Series AC/HP Thermostat Installation Instructions, Carrier Corp, Sep. 2007, 56 pages.
Trane Communicating Thermostats for Fan Coil, Trane, May 2011, 32 pages.
Trane Communicating Thermostats for Heat Pump Control, Trane, May 2011, 32 pages.
Trane Install XL600 Installation Manual, Trane, Mar. 2006, 16 pages.
Trane XL950 Installation Guide, Trane, Mar. 2011, 20 pages.
Venstar T2900 Manual, Venstar, Inc., Apr. 2008, 113 pages.
Venstar T5800 Manual, Venstar, Inc., Sep. 7, 2011, 63 pages.
VisionPRO TH8000 Series Installation Guide, Honeywell International, Inc., Jan. 2012, 12 pages.
VisionPRO TH8000 Series Operating Manual, Honeywell International, Inc., Mar. 2011, 96 pages.
VisionPRO Wi-Fi Programmable Thermostat, Honeywell International, Inc. Operating Manual, Aug. 2012, 48 pages.
White Rodgers (Emerson) Model 1F81-261 Installation and Operating Instructions, White Rodgers, Apr. 15, 2010, 8 pages.
White Rodgers (Emerson) Model IF98EZ-1621 Homeowner's User Guide, White Rodgers, Jan. 25, 2012, 28 pages.

Akhlaghinia et al., "Occupancy Monitoring in Intelligent Environment through Integrated Wireless Localizing Agents", IEEE, 2009, 7 pages.
Akhlaghinia et al., "Occupant Behaviour Prediction in Ambient Intelligence Computing Environment", Journal of Uncertain Systems, vol. 2, No. 2, 2008, pp. 85-100.
Allen et al., "Real-Time Earthquake Detection and Hazard Assessment by ElarmS Across California", Geophysical Research Letters, vol. 36, L00B08, 2009, pp. 1-6.
Arens et al., "Demand Response Enabling Technology Development", Phase I Report: Jun. 2003-Nov. 2005, Jul. 27, P:/DemandRes/UC Papers/DR-Phase1Report-Final DraftApril24-26.doc, University of California Berkeley, pp. 1-108.
Arens et al., "New Thermostat Demand Response Enabling Technology", Poster, University of California Berkeley, Jun. 10, 2004.
Bourke, "Server Load Balancing", O'Reilly & Associates, Inc., Aug. 2001, 182 pages.
Deleeuw, "Ecobee WiFi Enabled Smart Thermostat Part 2: The Features Review", Retrieved from <URL: http://www.homenetworkenabled.com/content.php?136-ecobee-WiFi-enabled-Smart-Thermostat-Part-2-The-Features-review>, Dec. 2, 2011, 5 pages.
Detroitborg, "Nest Learning Thermostat: Unboxing and Review", [online]. Feb. 2012 [retrieved on Aug. 22, 2013]. Retrieved from the Internet: <URL: http://www.youtube.com/watch?v=KrgcOL4oLzc>.
Gao et al., "The Self-Programming Thermostat: Optimizing Setback Schedules Based on Home Occupancy Patterns", In Proceedings of the First ACM Workshop on Embedded Sensing Systems for Energy-Efficiency in Buildings, Nov. 3, 2009, 6 pages.
Loisos et al., "Buildings End-Use Energy Efficiency: Alternatives to Compressor Cooling", California Energy Commission, Public Interest Energy Research, Jan. 2000, 80 pages.
Lu et al., "The Smart Thermostat: Using Occupancy Sensors to Save Energy in Homes", In Proceedings of the 8th ACM Conference on Embedded Networked Sensor Systems, Nov. 3-5, 2010, pp. 211-224.
Mozer, "The Neural Network House: An Environmental that Adapts to its Inhabitants", AAAI Technical Report SS-98-02, 1998, pp. 110-114.
International Patent Application No. PCT/US2012/059107, International Search Report & Written Opinion, mailed Jan. 3, 2013, 10 pages.
Ros et al., "Multi-Sensor Human Tracking with the Bayesian Occupancy Filter", IEEE, 2009, 8 pages.
White et al., "A Conceptual Model for Simulation Load Balancing", Proc. 1998 Spring Simulation Interoperability Workshop, 1998, 7 pages.
Wong et al., "Maximum Likelihood Estimation of ARMA Model with Error Processes for Replicated Observations", National University of Singapore, Department of Economics, Working Paper No. 0217, 2002, 19 pages.
International Preliminary Report on Patentability mailed Apr. 15, 2014 for International Patent Application No. PCT/US2012/059107 filed Oct. 5, 2012, 10 pages.

* cited by examiner

FIG. 6

| | Level 0 3.7V (battery normal) 610 | Level 1 3.5V (battery low) 612 | Level 2 3.3V (battery very low) 614 | Level 3 (nearly empty) 618 | |
|---|---|---|---|---|---|
| | 100% | 75% | 25% | Backlight Off | LCD brightness |
| | On – High Freq | On – Lower Freq | Very low freq | Off | Background learning algorithms |
| | WiFi On | Wifi Off (or low); Zigbee High | Wifi Off; Zigbee Low | All Off | Wireless communication |
| | High Frequency | Low Frequency | Off | Off | Proximity-triggered-wake-up |
| | High Frequency | Med Frequency | Low Frequency | Off | PIR (and other occupancy) sensors |
| | On | On | On | Off | Ambient light sensing |
| | On | On | On | Off | Input devices (e.g. rotating wheel) |
| | Full | Full | Basic | Off | GUI funcitons |
| | All On | All On | First Stage On | All Off | HVAC Functions |
| | On | On | On | Off | Internal Logging |
| | Full speed | Full speed | Reduced speed | Reduced speed | CPU clock frequency |

FIG. 11

|  | 1120 | 1110 | 1112 | 1114 | 1116 |
|---|---|---|---|---|---|
|  | Awake | Sleep | Halt | Vcc Main Disconnect | Suspend/ Shutdown |
| Shelf life |  | ~1day | ~weeks | ~months | ~years |
| HVAC Support | yes | yes | no/opt. | no/opt. | no |
| Wakeup Sources |  | On button Rotary Prox Alarm BP WiFi | On button Alarm BP | BP | HVAC Power<br><br>USB Power |
| Backplate Power | on | on | on | on | off |

Power Saving Levels 0, 1, 2 (covers Awake, Sleep, Halt)
Power Saving Level 3 (covers Vcc Main Disconnect)
Battery Disconnect (covers Suspend/Shutdown)

FIG. 12

|  | 1210 | 1212 | 1214 |
|---|---|---|---|
|  | Awake | background | Sleep |
| Display | on | off | off |
| Processor Activity | high | medium | none |
| Processor Power | on | on | off |

| Boot Type | Battery Level | Description |
|---|---|---|
| Cold Boot | Good | Automatic |
| Cold Boot | Low | BP holds Vcc_main disconnect until $V_{batt}$ is ok |
| From Halt | Good | BP "presses" On Button |
| From Halt | Low | BP waits for good battery level |
| From Halt to Shutdown | Any | Wake on real time clock and disconnect the battery |

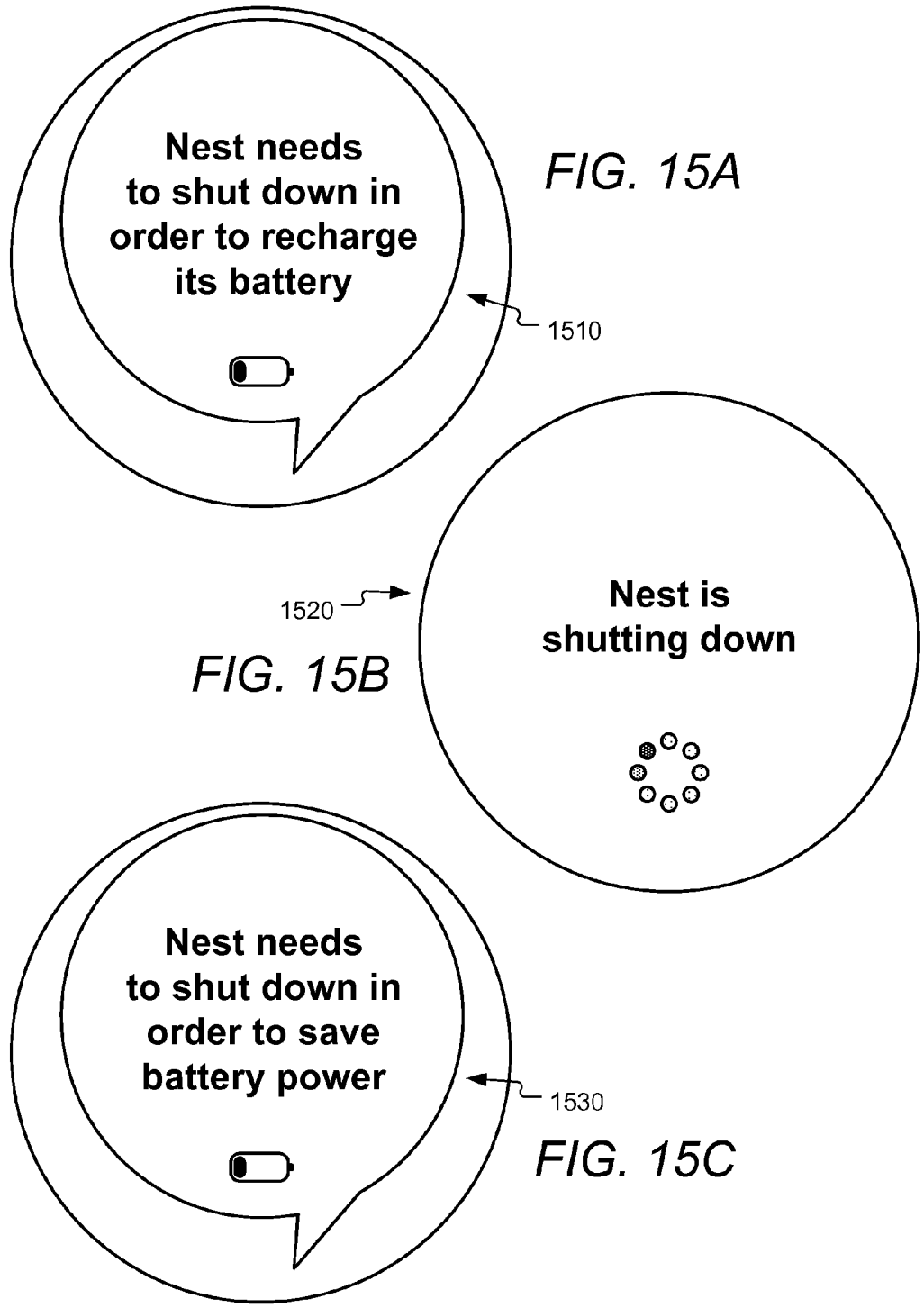

STRATEGIC REDUCTION OF POWER USAGE IN MULTI-SENSING, WIRELESSLY COMMUNICATING LEARNING THERMOSTAT

CROSS-REFERENCE TO RELATED APPLICATIONS

This patent application claims the benefit of U.S. Prov. Ser. No. 61/415,771 filed Nov. 19, 2010; and of U.S. Prov. Ser. No. 61/429,093 filed Dec. 31, 2010, each of which is incorporated by reference herein. The subject matter of this patent specification also relates to the subject matter of the following commonly assigned applications: U.S. Ser. No. 12/881,430 filed Sep. 14, 2010; U.S. Ser. No. 12/881,463 filed Sep. 14, 2010; U.S. Ser. No. 12/984,602 filed Jan. 4, 2011; U.S. Ser. No. 12/987,257 filed Jan. 10, 2011; U.S. Ser. No. 13/033,573 and US. Ser. No. 29/386,021, filed Feb. 23, 2011; U.S. Ser. No. 13/034,666, U.S. Ser. No. 13/034,674 and U.S. Ser. No. 13/034,678 filed Feb. 24, 2011; U.S. Ser. No. 13/038,206 and U.S. Ser. No. 13/038,191 filed Mar. 1, 2011; U.S. Ser. No. 13/199,108, filed Aug. 17, 2011; and U.S. Ser. No. 13/267,871 filed Oct. 6, 2011. Each of the above-referenced patent applications is incorporated by reference herein. The above-referenced patent applications are collectively referenced hereinbelow as "the commonly assigned incorporated applications."

FIELD

This invention relates generally to the monitoring and control of HVAC systems and/or for other systems for controlling household utilities, and/or resources. More particularly, embodiments of this invention relate facilitating strategic reduction of power usage in a control device such as a thermostat having a rechargeable battery.

BACKGROUND

Thermostats having electronics, such as programmable thermostats, may rely on an independent power source, such as a disposable battery. However, a disposable battery eventually needs to be replaced by the user. Attempts have been made to reduce power usage when the battery's remaining power is running low. For example, U.S. Pat. No. 6,513,723 discusses an HVAC system comprising a main thermostat unit and a plurality of remote sensors, each remote sensor being powered by a replaceable battery. Each remote sensor includes a user interface comprising an LCD display that displays a temperature, and further includes a temperature-up control button and a temperature-down control button. For each remote unit, when its battery level is at or below 30 percent of remaining power, the LCD display stops displaying the temperature and only displays a low-battery indication, unless one of the control buttons is pressed. If one of the control buttons is pressed, the LCD temperature display is activated for 120 seconds and then turns off again.

U.S. Pat. No. 7,537,171 also discusses an HVAC system comprising a main thermostat unit and a plurality of remote sensors, each remote sensor being powered by a replaceable battery. To extend battery life while at the same time promoting reliable communication, each remote unit is capable of transmitting signals at each of a lower power level (lower data transfer rate) and a higher power level (higher data transfer rate), and is configured to transmit signals more often at the lower power level than at the higher power level.

U.S. Patent Application Publication No. 20100084482 A1 discusses a microprocessor-controlled, wirelessly communicating programmable thermostat that is powered by household AC current. The use of household AC current is indicated as being advantageous in that "the thermostat can perform functions requiring increased power, such as processor intensive functions and wireless communications, which would not be realistic using battery power or power stealing techniques."

Electronic thermostats can also be powered directly from an HVAC system transformer such as using a 24 VAC "common" wire ("C wire") from the transformer, but only if one is available. When provided, the C wire has the particular purpose of supplying power for an electronic thermostat. However, many HVAC installations do not have a C-wire provided to the thermostat. For such cases, many electronic thermostats have been designed to extract power from the transformer from the circuit used to turn on and off the HVAC function, which is called "power stealing", or "power sharing." The thermostat "steals," "shares" or "harvests" its power during the "OFF" periods of the heating or cooling system by allowing a small amount of current to flow through it into the load coil below its response threshold (even at maximum transformer output voltage). During the "ON" periods of the heating or cooling system the thermostat draws power by allowing a small voltage drop across itself. Hopefully, the voltage drop will not cause the load coil to dropout below its response threshold (even at minimum transformer output voltage). Examples of thermostats with power stealing capability include the Honeywell T8600, Honeywell T8400C, and the Emerson Model 1F97-0671.

Co-pending U.S. patent application Ser. No. 13/034,678 filed on Feb. 24, 2011 discusses the use of a rechargeable battery that is recharged using power harvesting techniques. However, even with the use of a rechargeable battery, there may be conditions in which power usage significantly exceeds the rate at which the battery can be recharged. Additionally there may be times when the power is temporarily interrupted such that power harvesting, or power from any source, cannot be used to recharge the battery.

SUMMARY

According to some embodiments a method for strategically reducing power usage in a thermostat is described. The method includes supplying power for a plurality of thermostat activities using a rechargeable battery located within the thermostat; making at least one measurement associated with the rechargeable battery; and automatically altering one or more of the thermostat activities based at least in part on the measurement so as to reduce power usage from the rechargeable battery. According to some embodiments, the thermostat is a multi-sensing, wirelessly communicating learning thermostat that harvests power from the HVAC system to charge the rechargeable battery.

According to some embodiments the thermostat activities are altered in groups according to a progression of successive stages based on the voltage, or capacity remaining in the rechargeable battery. Examples of altered activities include reducing display backlighting level; curtailing wireless communications being used by the thermostat (in terms of frequency, amount and/or changing the communication platform used); reducing the frequency at which measurements are made with sensors; altering the operation of one or more learning algorithms; altering the operation of aspects of the user interface; and, in an HVAC system having more than one stage of heating or cooling, disabling one or more of the stages.

According to some embodiments, a thermostat is described that includes: a plurality of components that consume electrical power; a rechargeable battery for providing power to at least some of the plurality of components; and a processing system adapted and programmed to automatically alter thermostat functionality so as to reduce power usage based at least in part on a measurement associated with the rechargeable battery.

According to some embodiments a method is provided for reducing power usage in a thermostat having rechargeable battery, comprising: supplying power for a plurality of thermostat activities using a rechargeable battery located within the thermostat, the rechargeable battery being ordinarily recharged using power from an external power source; detecting a lack of power from the external power source; and automatically altering one or more of the thermostat activities based at least in part on the detecting of the lack of power from the external source, so as to reduce power usage from the rechargeable battery. According to some embodiments, the automatic altering is also based on a measurement associated with the rechargeable battery, such as battery voltage.

As used herein the term "HVAC" includes systems providing both heating and cooling, heating only, cooling only, as well as systems that provide other occupant comfort and/or conditioning functionality such as humidification, dehumidification and ventilation.

As used herein the terms power "harvesting," "sharing" and "stealing" when referring to HVAC thermostats all refer to the thermostat are designed to derive power from the power transformer through the equipment load without using a direct or common wire source directly from the transformer.

As used herein the term "residential" when referring to an HVAC system means a type of HVAC system that is suitable to heat, cool and/or otherwise condition the interior of a building that is primarily used as a single family dwelling. An example of a cooling system that would be considered residential would have a cooling capacity of less than about 5 tons of refrigeration (1 ton of refrigeration=12,000 Btu/h).

As used herein the term "light commercial" when referring to an HVAC system means a type of HVAC system that is suitable to heat, cool and/or otherwise condition the interior of a building that is primarily used for commercial purposes, but is of a size and construction that would be considered suitable for a residential HVAC system. An example of a cooling system that would be considered light commercial would have a cooling capacity of less than about 5 tons of refrigeration.

As used herein the term "thermostat" means a device or system for regulating parameters such as temperature and/or humidity within at least a part of an enclosure. The term "thermostat" may include a control unit for a heating and/or cooling system or a component part of a heater or air conditioner. As used herein the term "thermostat" can also refer generally to a versatile sensing and control unit (VSCU unit) that is configured and adapted to provide sophisticated, customized, energy-saving HVAC control functionality while at the same time being visually appealing, non-intimidating, elegant to behold, and delightfully easy to use.

It will be appreciated that these systems and methods are novel, as are applications thereof and many of the components, systems, methods and algorithms employed and included therein. It should be appreciated that embodiments of the presently described inventive body of work can be implemented in numerous ways, including as processes, apparata, systems, devices, methods, computer readable media, computational algorithms, embedded or distributed software and/or as a combination thereof. Several illustrative embodiments are described below.

BRIEF DESCRIPTION OF THE DRAWINGS

The inventive body of work will be readily understood by referring to the following detailed description in conjunction with the accompanying drawings, in which:

FIG. 6 is a diagram showing a four-level scheme for strategically reducing power usage in a thermostat, according to some embodiments;

FIG. 11 describes characteristics of various low power modes, according to some embodiments;

FIG. 12 describes further detail of the head unit in normal operation modes, according to some embodiments;

FIGS. 15A-C are illustrations show example notifications displayed to a user, according to some embodiments.

DETAILED DESCRIPTION

A detailed description of the inventive body of work is provided below. While several embodiments are described, it should be understood that the inventive body of work is not limited to any one embodiment, but instead encompasses numerous alternatives, modifications, and equivalents. In addition, while numerous specific details are set forth in the following description in order to provide a thorough understanding of the inventive body of work, some embodiments can be practiced without some or all of these details. Moreover, for the purpose of clarity, certain technical material that is known in the related art has not been described in detail in order to avoid unnecessarily obscuring the inventive body of work.

Figure 1:
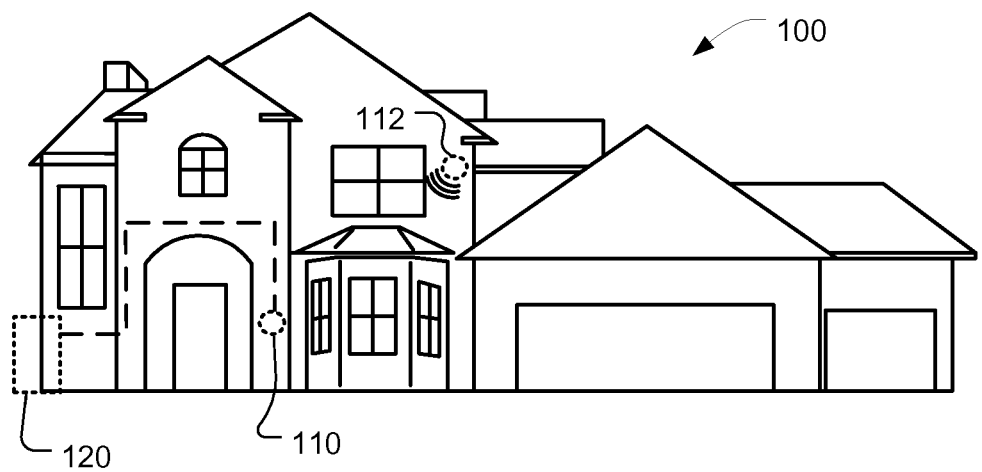
FIG. 1 is a diagram of an enclosure in which environmental conditions are controlled, according to some embodiments.

FIG. 1 is a diagram of an enclosure in which environmental conditions are controlled, according to some embodiments. Enclosure 100, in this example is a single-family dwelling According to other embodiments, the enclosure can be, for example, a duplex, an apartment within an apartment building, a light commercial structure such as an office or retail store, or a structure or enclosure that is a combination of the above. Thermostat 110 controls HVAC system 120 as will be described in further detail below. According to some embodiments, the HVAC system 120 has a cooling capacity less than about 5 tons. According to some embodiments, a remote device 112 wirelessly communicates with the thermostat 110 and can be used to display information to a user and to receive user input from the remote location of the device 112. Although many of the embodiments are described herein as being carried out by a thermostat such as thermostat 110, according to some embodiments, the same or similar techniques are employed using a remote device such as device 112.

Figure 2:
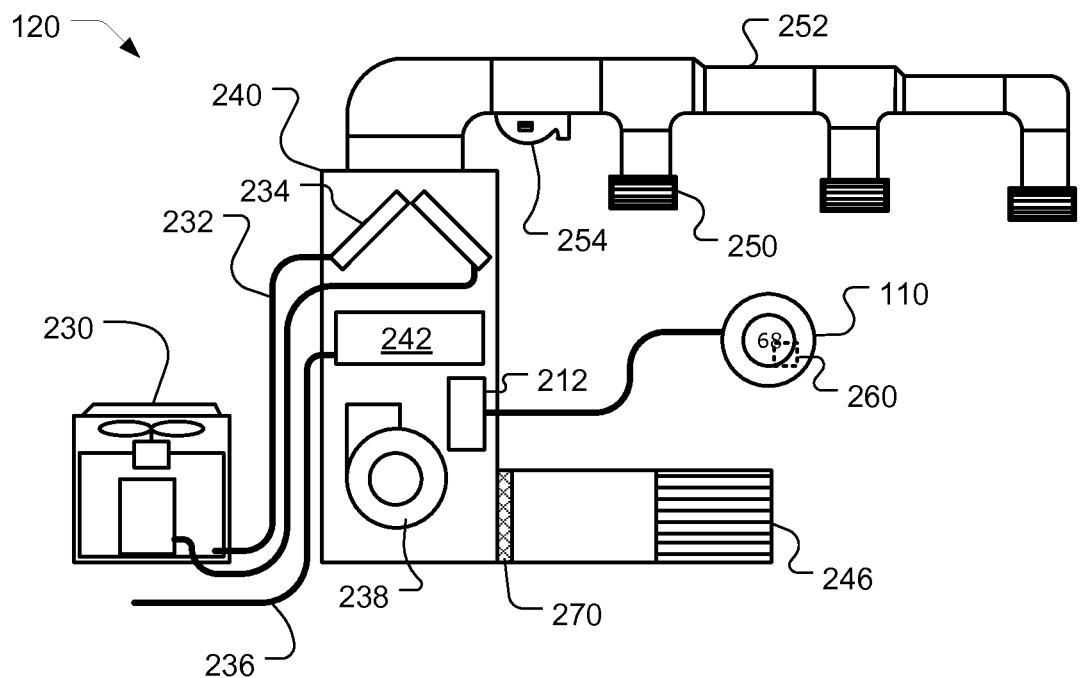
FIG. 2 is a diagram of an HVAC system, according to some embodiments.

FIG. 2 is a diagram of an HVAC system, according to some embodiments. HVAC system 120 provides heating, cooling, ventilation, and/or air handling for the enclosure, such as a single-family home 100 depicted in FIG. 1. The system 120 depicts a forced air type heating system, although according to other embodiments, other types of systems could be used. In heating, heating coils or elements 242 within air handler 240 provide a source of heat using electricity or gas via line 236. Cool air is drawn from the enclosure via return air duct 246 through filter 270, using fan 238 and is heated heating coils or elements 242. The heated air flows back into the enclosure at one or more locations via supply air duct system 252 and supply air grills such as grill 250. In cooling, an outside compressor 230 passes gas such as Freon through a set of heat exchanger coils to cool the gas. The gas then goes to the cooling coils 234 in the air handlers 240 where it expands, cools and cools the air being circulated through the enclosure via fan 238. According to some embodiments a humidifier 254 is also provided. Although not shown in FIG. 2, according to some embodiments the HVAC system has other known functionality such as venting air to and from the outside, and one or more dampers to control airflow within the duct systems. The system is controlled by control electronics 212 whose operation is governed by that a thermostat such as the thermostat 110. Thermostat 110 controls the HVAC system 120 through a number of control circuits. Thermostat 110 also includes a processing system 260 such as a microprocessor that is adapted and programmed to controlling the HVAC system and to carry out the techniques described in detail herein.

Figure 3A:
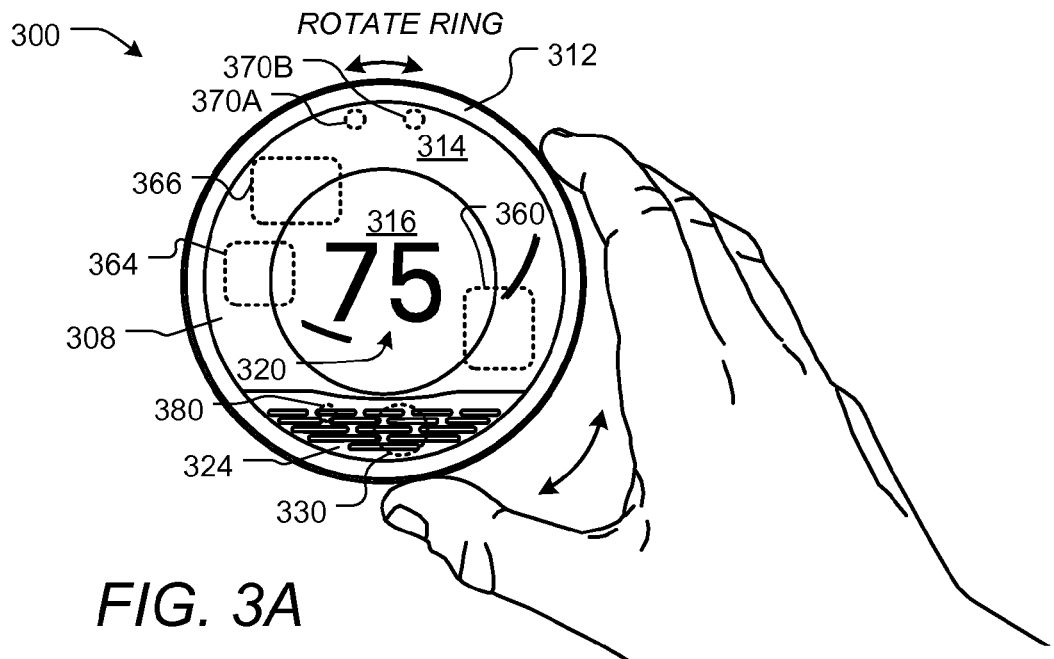
FIGS. 3A-B illustrate a thermostat having a user-friendly interface, according to some embodiments.
Figure 3B:
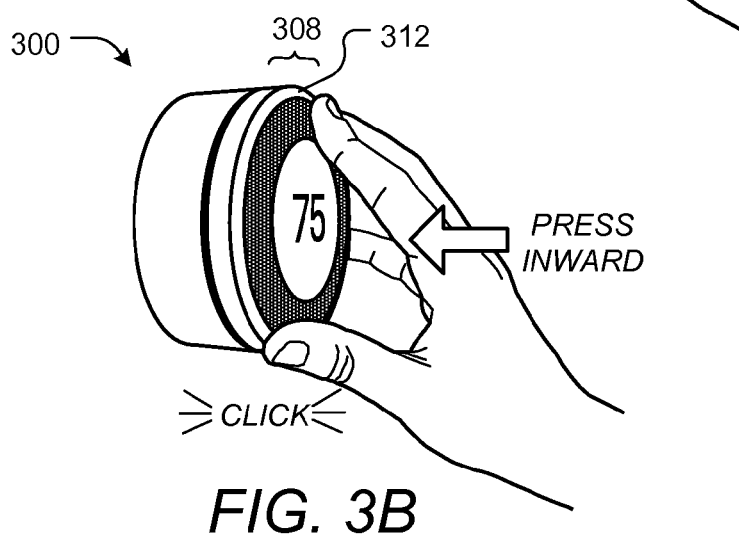

FIGS. 3A-B illustrate a thermostat having a user-friendly interface, according to some embodiments. Unlike many prior art thermostats, thermostat 300 preferably has a sleek, simple, uncluttered and elegant design that does not detract from home decoration, and indeed can serve as a visually pleasing centerpiece for the immediate location in which it is installed. Moreover user interaction with thermostat 300 is facilitated and greatly enhanced over known conventional thermostats by the design of thermostat 300. The thermostat 300 includes control circuitry and is electrically connected to an HVAC system, such as is shown with thermostat 110 in FIGS. 1 and 2. Thermostat 300 is wall mounted, circular in shape, and has an outer rotatable ring 312 for receiving user input. Thermostat 300 has a large frontal display area 314. According to some embodiments, thermostat 300 is approximately 80 mm in diameter. The outer rotating ring 312 allows the user to make adjustments, such as selecting a new target temperature. For example, by rotating the outer ring 312 clockwise, the target temperature can be increased, and by rotating the outer ring 312 counter-clockwise, the target temperature can be decreased. Within the outer ring 312 is a clear cover 314 that according to some embodiments is polycarbonate. Also within the rotating ring 312 is a metallic portion 324, preferably having a number of windows as shown. According to some embodiments, the surface of cover 314 and metallic portion 324 form a curved spherical shape gently arcing outward that matches a portion of the surface of rotating ring 312.

According to some embodiments, the cover 314 is painted or smoked around the outer portion, but leaving a central display 316 clear so as to facilitate display of information to users. According to some embodiments, the curved cover 314 acts as a lens that tends to magnify the information being displayed in display 316 to users. According to some embodiments central display 316 is a dot-matrix layout (individually addressable) such that arbitrary shapes can be generated, rather than being a segmented layout. According to some embodiments, a combination of dot-matrix layout and segmented layout is employed. According to some embodiments, central display 316 is a backlit color liquid crystal display (LCD). An example of information is shown in FIG. 3A, which are central numerals 320. According to some embodiments, metallic portion 324 has number of openings so as to allow the use of a passive infrared motion sensor 330 mounted beneath the portion 324. The motion sensor as well as other techniques can be use used to detect and/or predict occupancy, as is described further in co-pending patent application U.S. Ser. No. 12/881,430, which is incorporated by reference herein. According to some embodiments, occupancy information is used in generating an effective and efficient scheduled program. The thermostat 300 is preferably constructed such that the electronic display 316 is at a fixed orientation and does not rotate with the outer ring 312, so that the electronic display 316 remains easily read by the user. For some embodiments, the cover 314 and metallic portion 324 also remain at a fixed orientation and do not rotate with the outer ring 312. According to one embodiment in which the diameter of the thermostat 300 is about 80 mm, the diameter of the electronic display 316 is about 45 mm. According to some embodiments, proximity and ambient light sensors 370A and 370B, respectively, are provided to sense visible and near-infrared light. The sensors 370A and 370B can be used to detect proximity in the range of about one meter so that the thermostat 300 can initiate "waking up" when a user is approaching the thermostat and prior to the user touching the thermostat. Such use of proximity sensing is useful for enhancing the user experience by being "ready" for interaction as soon as, or very soon after the user is ready to interact with the thermostat. Further, the wake-up-on-proximity functionality also allows for energy savings within the thermostat by "sleeping" when no user interaction is taking place our about to take place. According to some embodiments an LED indicator 380 is positioned beneath portion 324 to act as a low-power-consuming indicator of certain status conditions. For, example the LED 380 can be used to display blinking red when the battery is very low and is being recharged. More generally, the LED 380 can be used for communicating one or more status codes or error codes by virtue of red color, green color, various combinations of red and green, various different blinking rates, and so forth, which can be useful for troubleshooting purposes.

According to some embodiments, for the combined purposes of inspiring user confidence and further promoting visual and functional elegance, the thermostat 300 is controlled by only two types of user input, the first being a rotation of the outer ring 312 as shown in FIG. 3A (referenced hereafter as a "rotate ring" input), and the second being an inward push on the upper cap 308 (FIG. 3B) until an audible and/or tactile "click" occurs (referenced hereafter as an "inward click" input). For further details of suitable user-interfaces and related designs, which are employed, according to some embodiments, see co-pending Patent Applications U.S. Ser. No. 13/033,573 and US. Ser. No. 29/386,021, both filed Feb. 23, 2011, and are incorporated herein by reference.

According to some embodiments, the thermostat 300 includes a processing system 360, display driver 364 and a wireless communications system 366. The processing system 360 is adapted to cause the display driver 364 and display area 316 to display information to the user, and to receiver user input via the rotating ring 312. The processing system 360, according to some embodiments, is capable of maintaining and updating a thermodynamic model for the enclosure in which the HVAC system is installed. For further detail on the thermodynamic modeling, see U.S. patent Ser. No. 12/881,463 filed, which is incorporated by reference herein. According to some embodiments, the wireless communications system 366 is used to communicate with devices such as personal computers and/or other thermostats or HVAC system components.

Figure 4:
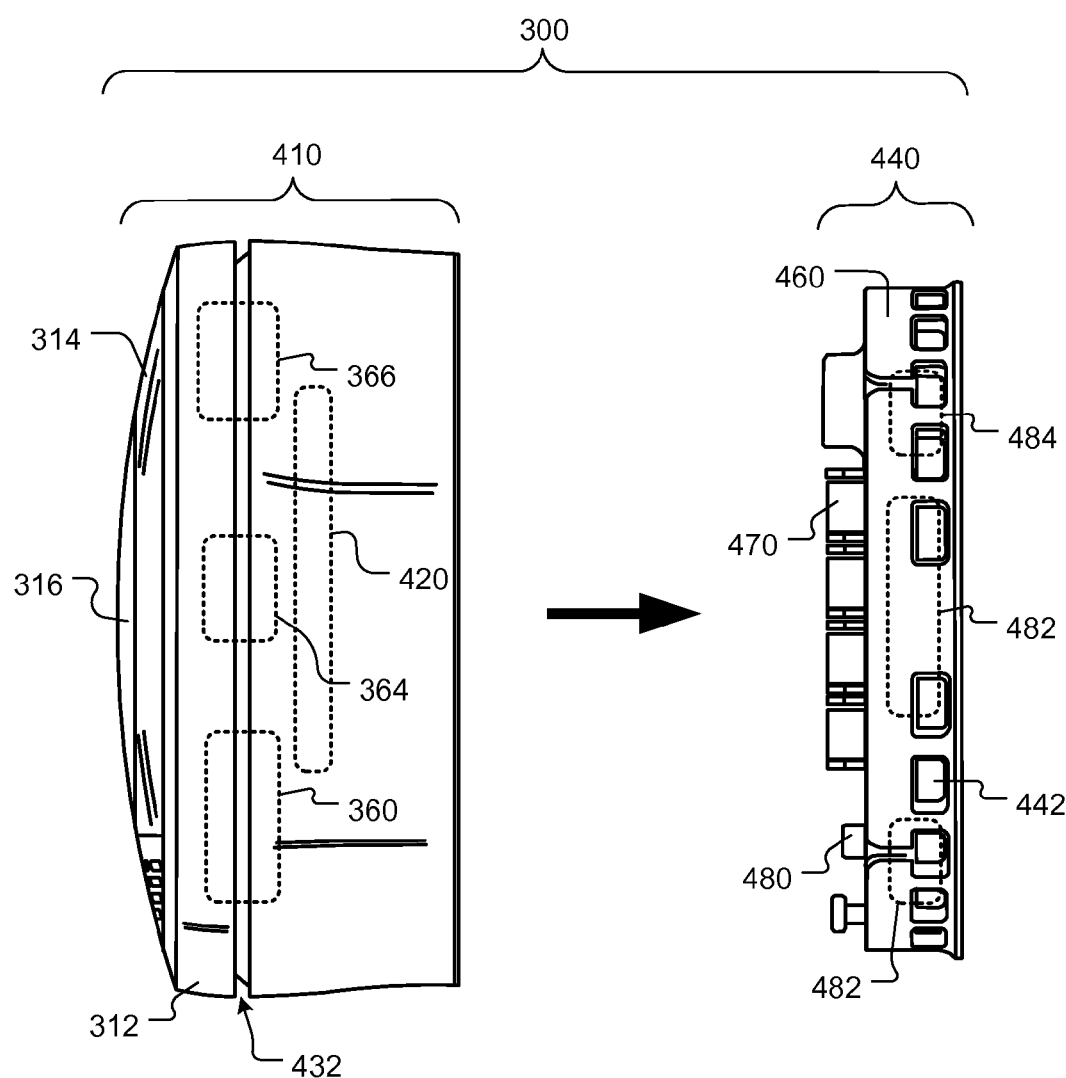
FIG. 4 illustrates a thermostat having a head unit and a backplate (or wall dock) for ease of installation, configuration and upgrading, according to some embodiments.

FIG. 4 illustrates a thermostat having a head unit and a backplate (or wall dock) for ease of installation, configuration and upgrading, according to some embodiments. As is described hereinabove, thermostat 300 is wall mounted and has circular in shape and has an outer rotatable ring 312 for receiving user input. Thermostat 300 has a cover 314 that includes a display 316. Head unit 410 of round thermostat 300 slides on to backplate 440. According to some embodiments the connection of the head unit 410 to backplate 440 can be accomplished using magnets, bayonet, latches and catches, tabs or ribs with matching indentations, or simply friction on mating portions of the head unit 410 and backplate 440. According to some embodiments, the head unit 410 includes a processing system 360, display driver 364 and a wireless communications system 366. Also shown is a rechargeable battery 420 that is recharged using recharging circuitry 422 that uses power from backplate that is either obtained via power harvesting (also referred to as power stealing and/or power sharing) from the HVAC system control circuit(s) or from a common wire, if available, as described in further detail in co-pending patent application U.S. Ser. Nos. 13/034,674, and 13/034,678, which are incorporated by reference herein. According to some embodiments, rechargeable battery 420 is a single cell lithium-ion, or a lithium-polymer battery.

Backplate 440 includes electronics 482 and temperature sensor 484 in housing 460, which are ventilated via vents 442. Wire connectors 470 are provided to allow for connection to HVAC system wires. Connection terminal 480 provides electrical connections between the head unit 410 and backplate 440. Backplate electronics 482 also includes power sharing circuitry for sensing and harvesting power available power from the HVAC system circuitry.

Figure 5:
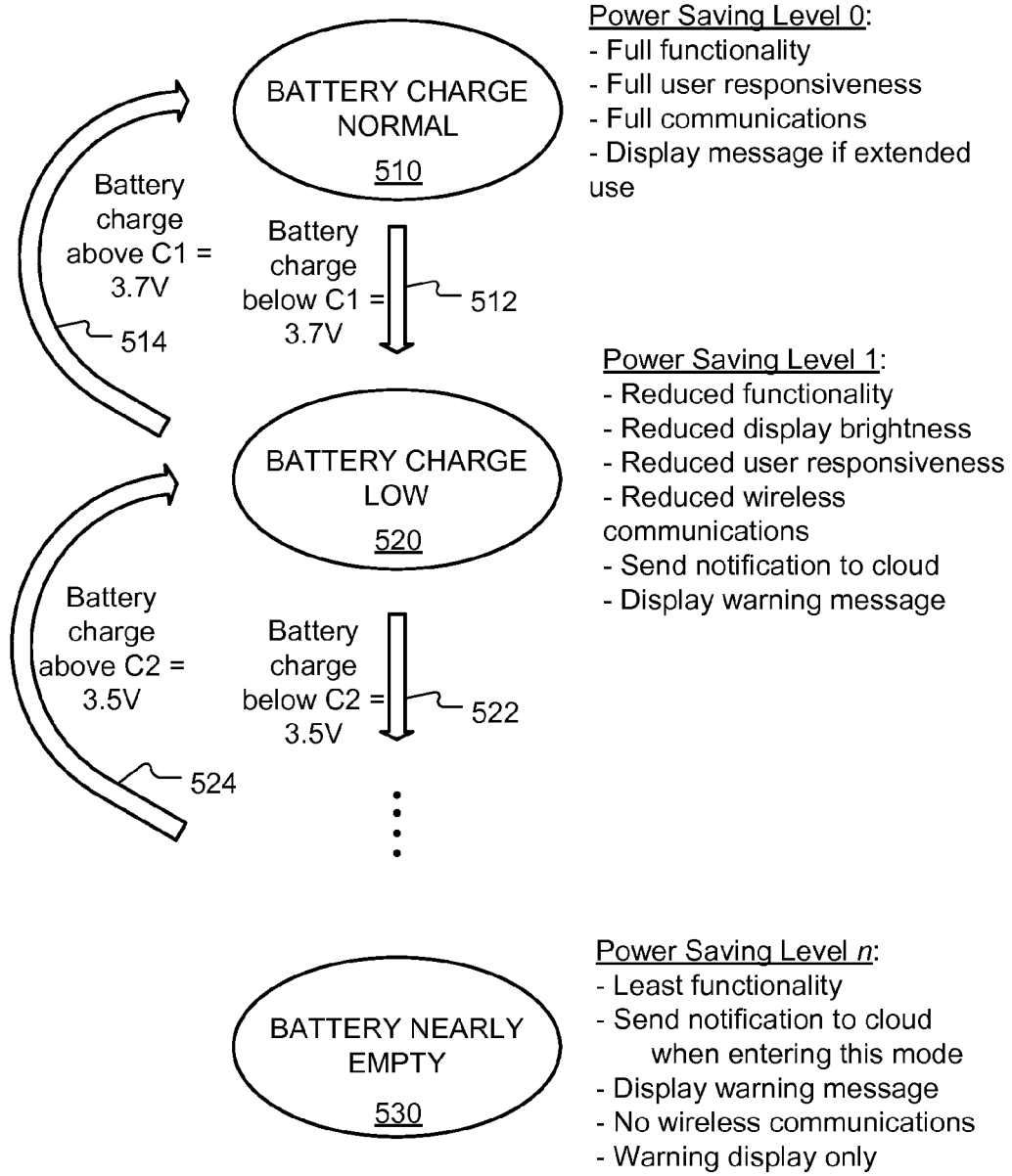
FIG. 5 is a flow chart illustrating states of strategically reducing power usage, according to some embodiments.

FIG. 5 is a flow chart illustrating states of strategically reducing power usage, according to some embodiments. The thermostat is, according to some embodiments, a multi-sensing, wirelessly communicating learning thermostat that uses power harvesting to charge an internal rechargeable battery, such as thermostats 110 and/or 300 in FIGS. 1-4 herein. Techniques are provided for ensuring that the battery does not become depleted or damaged while at the same time ensuring selected levels of functionality in the thermostat. According to some embodiments, the techniques described herein are also applicable to a thermostat that is powered by a common wire, in addition to or in combination with power harvesting.

According to some embodiments, the battery charge is monitored. If the battery charge is above a predetermined threshold voltage C1, the battery charge is considered "normal" (or "full" or "nearly full") which is shown as state 510 in FIG. 5. In the normal state 510, a power saving "Level 0" is implemented, which generally prioritizes functionality over power saving. Level 0 power saving preferably provides full thermostat functionality. For example, responsiveness to the user is a high priority to enhance the user experience such as a 100% LCD display backlighting, proximity-sensor-based "waking" of the thermostat, a high level of processing to maximize responsiveness and feedback of various algorithms (such as, for example, the processing and real time display of time-to-target temperature calculations, as described in further detail in co-pending U.S. patent application Ser. No. 12/984,602, filed Jan. 4, 2011, which is incorporated by reference herein). Additionally, at Level 0, sensor measurements, such as temperature, humidity, PIR, proximity and/or ambient light sensing, are preferably measured and/or recorded at a relatively high frequency.

According to some embodiments a message and/or icon is displayed to indicate the power or battery condition and/or to educate the user(s) as to power usage and/or battery life. For example, even if the battery charge is relatively good—such as in power saving Level 0, if the unit has been "awake" for more than 30 minutes in past 8 hours, an alert or caution message is displayed to the user informing user that extensive use of system will cause battery to run down every time the display wakes up. This message or similar information can additionally and/or alternatively be sent to a central cloud-based management server, which in turn can provide the warning or caution to the user on their smartphone remote thermostat control interface, and/or displayed on their web browser-based remote thermostat control application, these remote control capabilities being provided and/or orchestrated by the cloud-based management server as described in one or more of the commonly assigned incorporated applications. According to some embodiments, a battery depletion icon can be displayed in place of or in addition to a textual message.

If the battery charge moves from above C1 to below C1, as shown by arrow 512, the state is changed to a "battery charge low" state 520. This drop in voltage could result from, for example, the user interacting with the thermostat for a period of time during which the LCD display is backlit at full power, and the processors and/or communications modules are active, all which consume power at a greater rate than is being harvested or supplied. At state 520, a power saving "Level 1" is implemented. In Level 1, according to some embodiments, some functionality is curtailed to enhance power saving. Examples of decreased functionality at various levels of power saving will be described below with respect to each functionality type, but for example a Level 1 power saving may include: decreased backlight brightness for the display, decreased sampling rates for some or all sensors, decreased communication levels, and decreased processing by one or more of the processors.

According to some embodiments, a notification on the display of the thermostat is displayed indicating to user(s) that the battery is low. According to some embodiments, in power saving Level 1, a notification that the battery is low is transmitted to the cloud to notify the user(s) via a computer, smart phone, tablet PC, or similar device.

If the battery charge rises above the threshold C1, as shown by arrow 514, the thermostat's state is returned to the normal state 510. If the battery charge falls below a second predetermined threshold C2, then the thermostat state changes to the next lower state as shown by arrow 522 and a power saving level is implemented to further save reduce power consumption at the expense of functionality and/or user responsiveness. If the battery charge then rises back above level C2 then the state is changed back to state 520.

The lowest battery state is referred to in FIG. 5 as "Nearly Empty" state 530, in which power saving level "n" is implemented (where there are n+1 different power saving states). At the power saving level n, battery charge conservation is given the highest priority and the thermostat functionality and responsiveness is given the lowest priority. Examples include the display being turned off except for periodic warning messages that are displayed without backlighting, and no wireless communications.

According to some embodiments a four-level strategic power usage reduction technique can be implemented as follows: power saving level 0-full performance and functionality; level 1—slightly scaling back the performance and/or functionality (in terms of processing clock speed, LCD brightness, and/or duty cycles of sensing/communication activities) for all learning thermostat functionality; level 2—scaling back performance and functionality even further, down to a point of progressive turn-off of selected ones of a group of non-essential functionalities; and then level 3—scaling back performance and functionality even further, down to a point of progressive turn-off of selected ones of a group of essential functionalities.

According to various embodiments, various numbers of states and corresponding power saving levels may be implemented. For example according to some embodiments three levels of power saving are used, which can be called "normal," "low" and "nearly empty." This would reflect, for example the three states 510, 520 and 530 shown in FIG. 5. According to one embodiment a single threshold based on battery voltage is used in which there are only two states: normal and low. According to other embodiments, four of five levels of power saving are used, including a "normal," "nearly empty," and 2-3 intermediate levels of power saving (such as "slightly low," "low," "very low," etc.). According to some embodiments, greater than five levels of power saving are used.

Although according to some embodiments, the strategic reduction of power usage is based on monitoring the battery charge, according to some embodiments the reduction is based on other measurements, calculations, or combinations thereof. For example according to some embodiments the monitored battery charge is combined with knowledge of what power consuming activities are being undertaken. Estimates of power consumptions of individual activities and functions can be derived, for example from modeling and/or calibration performed by the thermostat manufacturer and stored in memory. The combination of the battery charge and active or predicted thermostat functions can then be used to determine an estimate for the time remaining before the battery is depleted assuming the current activity load. This remaining time estimate is then used for the thresholds (e.g. C1, C2, Cn, etc.) in the flow chart of FIG. 5. An advantage of embodiments that monitor battery charge alone, or estimate capacity and/or time remaining from the active functions, is that such techniques can be implemented without using additional hardware.

According to some embodiments, the amount of current being drawn from, or discharge rate of the battery is measured. The current draw and/or discharge rate is combined with battery voltage to determine an estimate of how much time or capacity remains. This estimate is then used to determine the power saving level, according to the techniques described with respect to FIG. 5. According to some embodiments, a battery capacity calculation is made that can be likened to a gas gauge in an automobile, which can be used to determine the appropriate power saving level. The example levels for C1=3.7V and C2=3.5V shown in FIG. 5 are examples for a case where the battery is a single-cell lithium-ion rechargeable battery. Other levels would be selected for other circumstances and for other battery designs, numbers of cells and/or chemistries.

FIG. 6 is a diagram showing a four-level scheme for strategically reducing power usage in a thermostat, according to some embodiments. The thermostat is, according to some embodiments, a multi-sensing, wirelessly communicating learning thermostat that uses power harvesting to charge an internal battery, such as thermostats 110 and/or 300 in FIGS. 1-4 herein. The diagram shows the status of various power consuming thermostat activities for each of four power saving levels, that correspond to the power saving levels as shown and described with respect to FIG. 5. Power saving level 0 (610) is for battery normal; power saving level 1 (612) is for battery low; power saving level 2 (614) is for battery very low; and power saving level 3 (618) is for battery nearly empty. As in the case with FIG. 5, the example voltage thresholds between level 0 and level 1=3.7V, between level 1 and level 2=3.5V, and between levels 2 and 3=3.3V are examples for a case where the battery is a single-cell lithium-ion rechargeable battery. While other levels would be selected for other circumstances, for example for other battery designs, numbers of cells and/or battery chemistries.

In general, each particular thermostat functionality is classified into non-essential and essential categories, examples of which are shown in FIG. 6. Following is further detail of the behavior of certain functions, during various power saving levels, according to some embodiments.

LCD Brightness. LCD brightness is a preferred way to reduce power consumption, according to many embodiments, since the reduction in LCD backlight is linearly related to power consumption (and savings), but the human eye perceives relative brightness logarithmically. Thus, a reduction by 10-20% brightness results a corresponding energy savings, but a typical user may not notice any drop in functionality. According to some embodiments, power saving level 0 allows up to 100% backlight; power saving level 1 is up to 75%, level 2 is up to 25%, and the nearly empty level (level 3) is completely off with the exception for warning display, which is periodically displayed at up to 5% brightness backlighting (or at the minimum brightness to be legible to a user).

Background Learning Algorithms. According to some embodiments background learning algorithms are performed by the head unit CPU, and involve polling various sensors (e.g. PIR, ambient light, etc.) and also use wireless communication to receive information from various sources and to interact with users. Examples of background learning algorithms include generating and/or updating thermodynamic models for the conditioned enclosure, and automatically generating or altering a thermostat schedule based on manually entered set point temperatures. The background learning algorithms consume power and can be run in various reduced power modes. For further details regarding background learning algorithms, see co-pending U.S. patent application Ser. No. 12/881,463, which is incorporated by reference herein. In the example shown in FIG. 6, in power saving level 1 the CPU can run the algorithms at a relatively high frequency, e.g. once per ten minutes throughout the day, so as to enhance the functionality and accuracy of the algorithms. In a level 1 power saving level, the CPU can run the algorithms at a reduced frequency, e.g. once every 60 minutes, so as to conserve power while still offering many advantages of the algorithms. In a severely reduce mode—level 2, the CPU can run the algorithms at a very low frequency, e.g. once every 8 hours. In the battery nearly empty mode, level 3, the background algorithms are not run at all. A similar approach can be taken for other algorithms such as "auto away/auto arrival."

Wireless Communications. According to some embodiments, Wi-Fi is a preferred wireless communication scheme when it is available and the battery has a full or nearly full change. However, other communication technologies such as ZigBee are used when available and when a lower level of power consumption is desired over the higher performance associated with Wi-Fi. In power saving level 0, the Wi-Fi is used and is in the "on" state. That is, the thermostat remains connected to the Wi-Fi server at all times. This provides a high level of interactivity and responsiveness, which has been found to enhance the user experience. If a user wishes to issue a command, for example to manually set a temperature using a device such as a smart phone or personal computer, the thermostat receives the command immediately and is able to carry out the user's command nearly instantaneously. According to some embodiments, in power saving level 1 the Wi-Fi can turn off and only "wake up" periodically, for example every 5-20 minutes, depending on the level of power savings desired. Upon a scheduled "wake up" the thermostat connects to the Wi-Fi server and checks for any messages and/or instructions, and communicates its status back to the cloud. In power saving levels 2 and higher, the Wi-Fi is shut off completely.

According to some embodiments in environments where both Wi-Fi and ZigBee communications networks are available to the thermostat, in a level 0 power saving mode the Wi-Fi is used as it allows for the greatest level of responsiveness and reliability. In a level 1 saving mode the Wi-Fi is turned off and ZigBee is used for communications instead. In a level 2 mode, the ZigBee is used but in a reduced power mode. For example, in level 2 power saving mode 614 shown in FIG. 6, the thermostat in "ZigBee Low" mode refuses to act in repeater for other ZigBee devices. For level 3, the ZigBee and Wi-Fi are both turned off such that there is no wireless communication.

Proximity-Triggered Wake-Up. As described above, sensors such as proximity infrared sensors can be used to implement waking up of the thermostat, such as turning on the processors and user interface hardware (including the LCD display) upon detecting an approaching user. In power saving level 0, the proximity-triggered wake up operates at its full sensing rate, for example 50 ms, so as to provide an enhanced user experience. In power saving level 1, the frequency is lowered, for example to 500 ms. At level 2 or 3, the proximity-triggered wake up feature is disabled, such that the user has to physically rotate the wheel or make an inward click to turn on the display and wake up the thermostat. According to some embodiments, the proximity-triggered wake-up features can implement a learning algorithm in order to reduce power usage in general. For example, an algorithm can be used that lowers the sensitivity of a proximity-triggered wake-up when the rate of "false positives" (e.g. proximity wake-up but no user interaction) is above a certain threshold; and the sensitivity is increased when the rate of "false negatives" (e.g. user interaction without a proximity wake-up) is below a certain threshold.

Passive Infrared and Other Sensors. According to some embodiments, the various sensors used (e.g. PIR, temperature, humidity, etc.) are operated at reduced rates of measurement so as to conserve power at various power saving levels. By reducing the sampling rates of the sensor, energy can be saved not only from the sensor hardware but also from processors that may have to turn on to record the measured parameter and in some cases communication of data. According to some embodiments, the PIR is operated at a higher polling frequency in level 0 so as to provide enhanced detection of occupancy. At power saving level 1, a medium frequency is used. At power saving level 2, a lower frequency is used. In level 3, the PIR is turned off and not used at all. Similar techniques can be used for other sensors, such as ambient light sensing, temperature, humidity, etc., depending on the energy saved by decreasing sampling frequency and importance of the measurement to the thermostat functionality.

Input Device. According to some embodiments, input devices are turned off to save power during higher levels of power saving. For example, the input wheel rotation sensing sampling is turned off at power saving level 3, such that only an inward click is sensed by the thermostat. The user interface is preferably designed such that it can gather the necessary user input using only inward click when operating in level 3 power saving mode.

GUI Functions. According to some embodiments, various levels of GUI interface can be turned off to save power. In levels 0 and 1, all the GUI functions operate as usual. In level 2, advanced GUI functions are not used in favor of simple messages and a low-battery message. In level 3, only the low battery message is periodically displayed using no backlight or a very low backlight as is described above.

HVAC Functions. According to some embodiments some or all of the HVAC functions can be turned off in order to conserve thermostat power. For example, in power saving level 2, higher stages of any multi-stage HVAC system are not used such that only a single stage of each function (e.g. heating, cooling, etc.) is operable. According to some embodiments, in level 3, all HVAC functions can be turned off. According to some embodiments, extreme temperatures are avoided (e.g. below 50 degrees F. and above 100 degrees F.) when operating in power saving level 3.

Internal Logging. According to some embodiments, internal logging of data to NAND memory can be turned off to save power, such as in the extreme case of power saving level 3 as shown in FIG. 6. Pushing these logs to the cloud can also be periodically suspended to save power.

CPU Clock Frequency. According to some embodiments, the CPU clock speed is reduced to save power, such as running at a reduced speed in power saving levels 2 and 3 as shown in FIG. 6.

Figure 7:
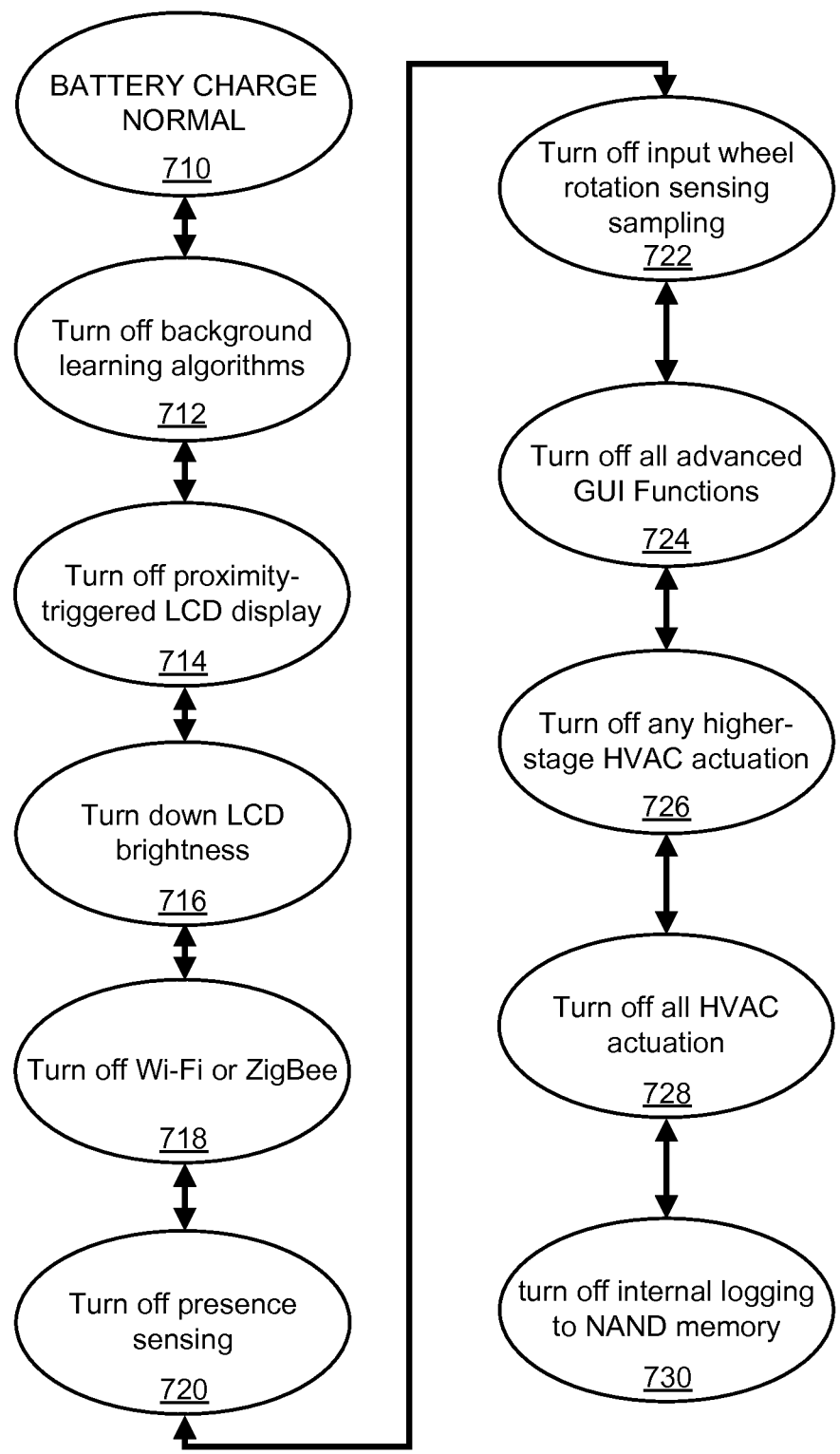
FIG. 7 shows a flow chart for a sequential shut down of functionality for reducing power usage in a thermostat, according to some embodiments.

FIG. 7 shows a flow chart for a sequential shut down of functionality for reducing power usage in a thermostat, according to some alternate embodiments. In the preferred embodiments described and shown in FIGS. 5 and 6, a progression of power saving levels are implemented wherein at each level various functions are operated at reduced power and/or turned off in order to reduce power consumption according to a predetermined progressive power conservation algorithm. Thus when a threshold is met, such as the battery charge dropping below a certain level, multiple functions are changed or turned off according to the scheme being implemented. In the example embodiment shown in FIG. 7, however, a less preferred embodiment, which can be called a progressive "binary" shutdown method, is implemented. In the binary shutdown method there is a simple progressive shutdown of functionalities turned off in sequence until the desired amount of discharge stemming is reached.

In the example shown in FIG. 7, a fixed progression is shown wherein each step from 710 to 730 corresponds to a measured threshold such as a slightly lower measured battery voltage. The normal, or fully charged (nor nearly fully charged) battery state 710 is shown in which all functions are operated. In state 712, which is triggered by the battery voltage dropping below a certain threshold, background learning algorithms are turned off. If the battery voltage drops below the next threshold, then, in state 714, proximity-triggered LCD display (or wake up) is turned off. In state 716 LCD brightness is turned down by 50%. In state 718, Wi-Fi and/or ZigBee are turned off, or the communication method is switched from Wi-Fi to ZigBee. In step 720, presence (or proximity sensing is turned off). In step 722, input wheel rotation sensing sampling is turned off. In step 724 all advanced GUI functions are turned off in favor of simple messages and a low-battery message. In step 726, any higher-stage HVAC functions (such as second stage heating and/or cooling) are disabled. In step 728 all HVAC actuation is discontinued. And in step 730, which corresponds to the lowest battery voltage level, internal logging to NAND memory is discontinued. When battery voltage increases, the progression shown in FIG. 7 is reversed, and the various functions are re-activated in the order shown.

Figure 8:
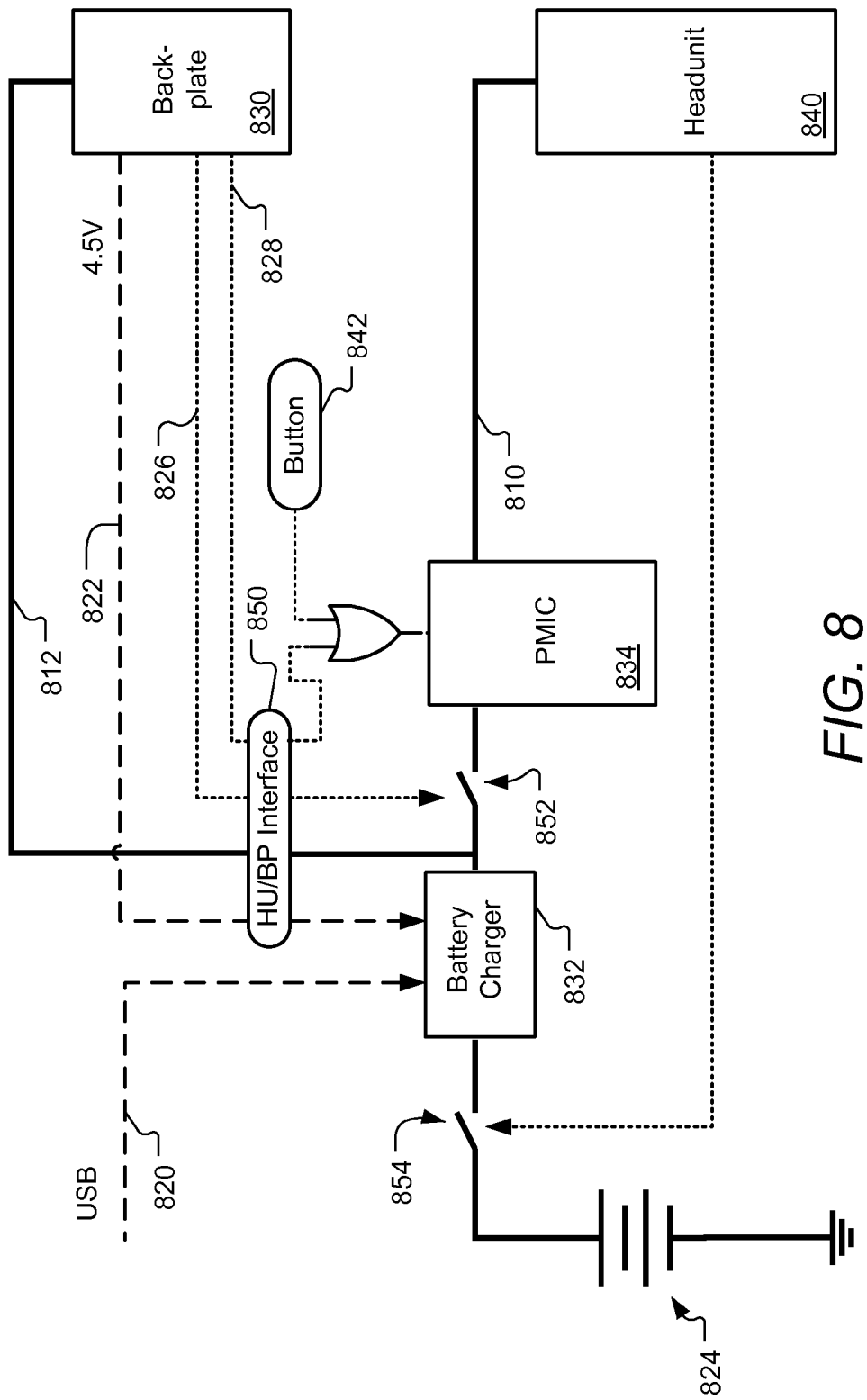
FIG. 8 is a high-level block diagram of power interconnections for a thermostat having a head unit and backplate, according to some embodiments.

Further details of power saving measures will now be provided, according to some preferred embodiments. FIG. 8 is a high-level block diagram of power interconnections for a thermostat having a head unit and backplate, according to some embodiments. The heavy solid lines, such as lines 810 and 812, represent power rails. In particular, the power rail 810 supplies power to the head unit electronics 840 and the power rail 812 supplies power to the back-plate electronics 830. The dashed lines, such as lines 820 and 822, represent sources that can be used to charge the rechargeable battery 824. In particular, the USB power source 820 and/or the HVAC power source 822 (e.g. from an HVAC common wire and/or from power stealing from one of the HVAC control circuits) supplies power to the battery charger 832. The dotted lines, such as lines 826 and 828, represent digital control lines. The backplate electronics 830 and head unit electronics 840 are separated by a head unit/back-plate interface 850 (which corresponds to the interface that includes connection terminal 480 shown in FIG. 4). When the head unit and back-plate are disconnected the four wires passing through interface 850 are disconnected. Button 842 is an "On" button that is used to turn the thermostat on, or wake it from a sleeping state. The on button 842 corresponds to an inward click as described with respect to FIGS. 3A-B. Battery disconnect switch 854 is used to completely disconnect the battery from the rest of the thermostat electronics (apart from some battery protection circuitry, not shown, that forms part of the rechargeable battery package). Disconnecting the battery is useful in preserving battery power during extended periods when no external power is available (such as sitting on a store shelf prior to installation, or when installed in a vacation home that has power shut off for certain times of the year). According to some embodiments, as is described in further detail with respect to FIG. 11, the battery disconnect switch 854 is opened by the head unit electronics 840 under certain conditions, and then can be closed again when either USB power 820 or backplate power 822 is detected. A head unit power shutdown switch 852 can be used to cut off power to the head unit while still allowing power to the backplate via power rail 812. Power management circuit 834 controls power to the head unit circuitry, which can "wake" the head unit from a sleeping state due to signal from on button 842, or under request from backplate 830.

According to some embodiments, when a loss of supply power is detected (such as a loss of HVAC power source line 822 in FIG. 8) then a message and/or icon is displayed indicating that HVAC power has been lost. Additionally, according to some embodiments a message to the "cloud" can be transmitted to notify the user(s) that the HVAC power has been interrupted via a computer, smart phone, tablet PC, or similar device. Note that the detection of loss of power, according to some embodiments using an analog to digital converter upstream of or within power management circuitry 834. For further detail of adaptive power stealing circuitry see co-pending application U.S. Ser. No. 13/267,871 filed Oct. 6, 2011.

Note that according to some embodiments, when USB power is detected then the power state is fine and no special power handling is needed. When USB power is detected, the thermostat is most likely connected to a computer host (e.g. for updating).

Figure 9:
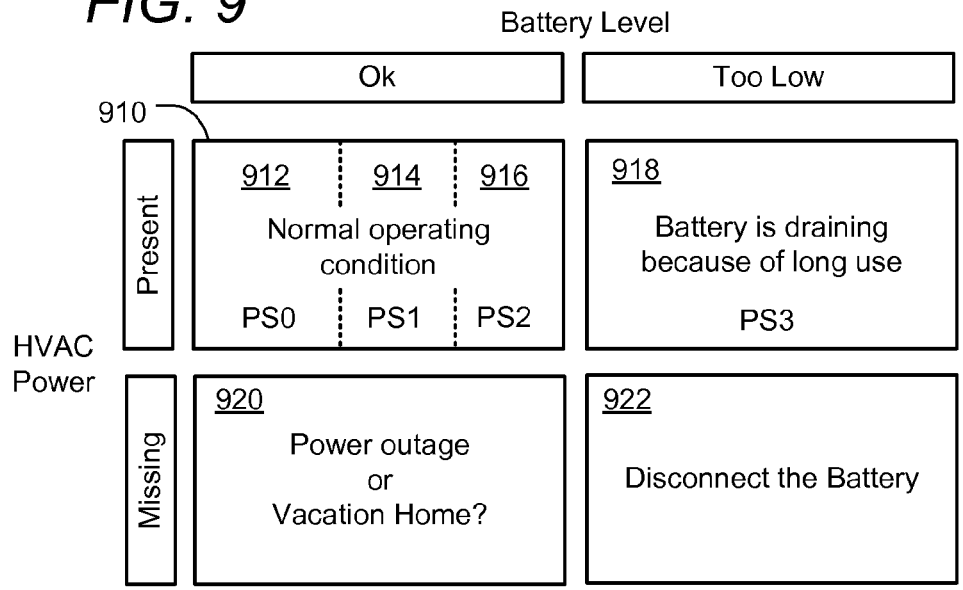
FIG. 9 is a diagram illustrating aspects of strategic power savings in a thermostat having a rechargeable battery, according to some embodiments.

FIG. 9 is a diagram illustrating aspects of strategic power savings in a thermostat having a rechargeable battery, according to some embodiments. If HVAC power (or USB power) is present, and the battery level is above an "Ok" level ($V_{batt} > V_{Ok}$), then the thermostat is in a normal operating condition state 910. Note that this state corresponds to the previously described power saving Levels 0, 1 and 2 of FIG. 6, shown in FIG. 9 as sub-states 912, 914 and 916, respectively. If HVAC power is present, but the battery voltage drops to "too low" level ($V_{batt} < V_{Ok}$), then the thermostat enters a state 918, which indicates the battery has been drained because of over use of the thermostat's user interface. This state 918 corresponds to a power saving Level 3 as described with respect to FIG. 6.

If a loss of HVAC system supplied power is detected, but the battery is above a threshold "Ok" level ($V_{batt} > V_{Ok\text{-}No\ HVAC}$), then the thermostat is in a state 920 in which most likely corresponds to a temporary power outage or an intentional long-term power shut down such as with a vacation home. If the battery charge drops below an "Ok" level ($V_{batt} \leq V_{Ok\text{-}No\ HVAC}$) then in state 922 the battery is disconnected from the thermostat (e.g. using the battery disconnect switch 850 shown in FIG. 8). Note that the "Ok" voltage level for situations where the HVAC power is present or missing is different, according to some preferred embodiments. This is because a different, lower voltage threshold can be tolerated in cases where re-charging power is present then when re-charging power is missing. For example, according to some embodiments, $V_{Ok}$ is set to 3.3 volts, but $V_{Ok\text{-}No\ HVAC}$ is set to 3.7 volts. Further discussion of the behavior when HVAC power is lost is discussed with respect to FIG. 13.

Figure 10:
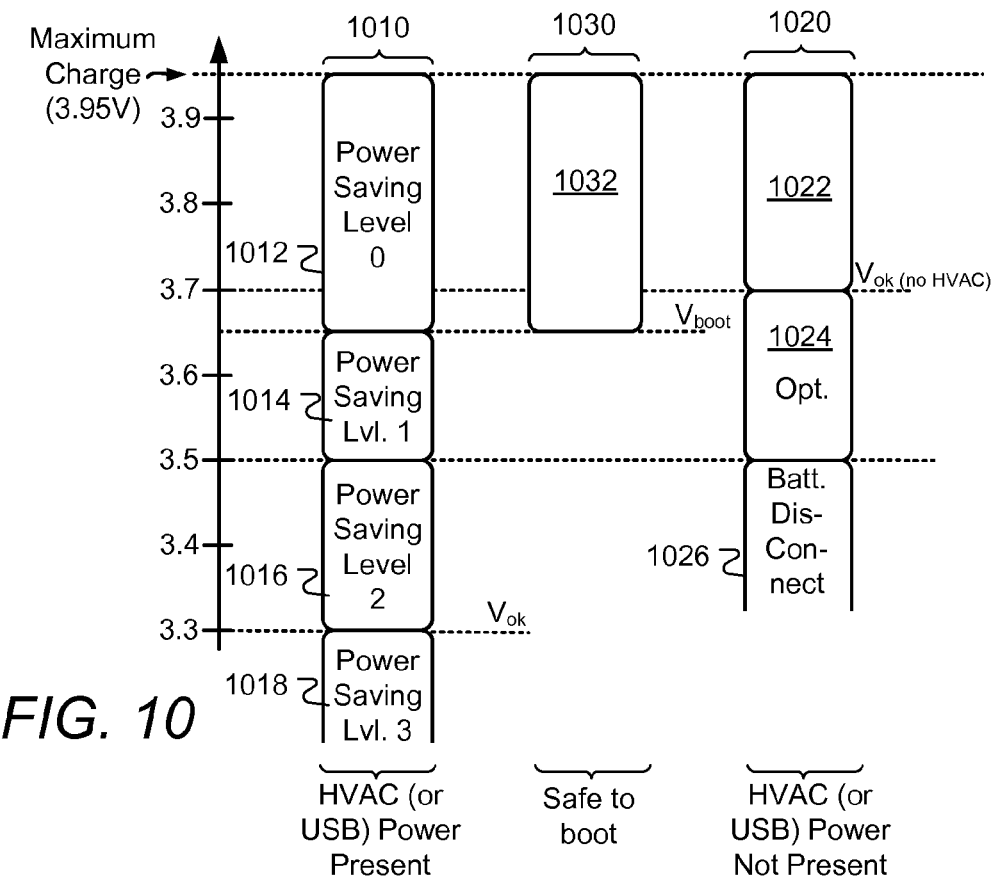
FIG. 10 is a diagram showing relevant battery voltages corresponding to various thresholds and power saving states, according to some embodiments.

FIG. 10 is a diagram showing relevant battery voltages corresponding to various thresholds and power saving states, according to some embodiments. Three different cases are shown. Column 1010 shows the voltages for power saving levels implemented when HVAC power is present. Column 1020 shows the voltages for the case when HVAC power is missing (as in a power failure or a shut down dwelling). Column 1030 shows the voltage associated with booting up the system.

In column 1010, the rectangles 1012, 1014, 1016 and 1018 show the voltage ranges for power saving levels 0, 1, 2 and 3 respectively. According the embodiment shown in FIG. 10, the threshold voltages are 3.65, 3.5 and 3.3 volts. According to some other embodiments, the threshold voltages are 3.6, 3.5 and 3.4 volts. When the battery voltage drops below the last threshold (e.g. 3.3 or 3.4 volts, depending on the embodiment), the unit displays a screen that the thermostat "needs to shut down in order to recharge the battery," an example of which is shown in notification 1510 of FIG. 15A. According to some embodiments, after displaying the notification, the thermostat remains active for a predetermined time (such as 30 seconds) and then displays a second notification the thermostat "is shutting down," an example of which is shown in notification 1520 of FIG. 15B. Then the thermostat enters a "halt" mode (show in FIG. 11), which corresponds to power saving Level 3, according to some embodiments.

In column 1020, the rectangles 1022 and 1024 show the voltage ranges for safe operation and a "halt" state respectively. When the battery voltage drops below 3.7 volts and no HVAC power is detected, the unit shows a screen that the thermostat "needs to shut down in order to save battery power," an example of which is shown in notification 1530 of FIG. 15C. According to some embodiments, after displaying the notification, the thermostat remains active for a predetermined time (such as 30 seconds) and then displays a second notification the thermostat "is shutting down." The thermostat will then enter the "halt" state in which it is partially shut down and the thermostat waits for the power to turn back on. When the battery voltage drops below 3.5 volts, the battery is disconnected in state 1026. According to other embodiments, a waiting time is used to determine when to enter a "halt" state and when to disconnect the battery, as described in further detail with respect to FIG. 12. Note that the threshold voltage of "Ok" is different for the cases when HVAC power (a reliable battery re-charging source) is present, and when HVAC power is missing.

According to some preferred embodiments, the intermediate state 1024 is not used. Rather when the battery voltage drops below 3.7 volts (without a power source) a notification such as shown in FIG. 15C is displayed, followed by a predetermined waiting period (e.g. 30 seconds). A notification that the thermostat is shutting down is then displayed (as in FIG. 15B), after which the battery disconnect state 1026 is entered.

The voltage $V_{boot}$ in column 1030 defines the voltage range in rectangle 1032 at which it is safe to boot the head unit. If booting is attempted below the $V_{boot}$ then "boot loops" are possible, where the system boots, but where the booting process consumes enough power to trigger a system shut down, followed by another booting. According to some embodiments, it is the job of the backplate to make sure and "trap" the system and charge the battery if attempts are made to boot with the battery outside of the safe to boot range (i.e. $V_{batt} > V_{boot}$). Note that the example voltage threshold levels shown in FIG. 10 have been found to be suitable for a particular design that includes a single-cell lithium-ion rechargeable battery. Other levels would be selected for other circumstances and for other battery and/or circuit designs, numbers of cells and/or chemistries.

FIG. 11 describes characteristics of various low power modes, according to some embodiments. In this example, there are 3 different low power modes designed into the hardware: sleep mode 1110, halt mode 1112, and suspend mode 1116, in addition to an awake mode 1120 and a "Vcc Main Disconnect" mode 1114 which is used by the backplate to prevent boot loops. The sleep mode 1110 is the mode in which the thermostat spends most of its time. When the system is activated to perform an activity or interact with the user(s) it temporarily enters the awake mode 1120, and then returns back to sleep mode 1110. The halt mode 1112 is a more extensive power down mode where we halt the head unit operating system. Shutdown or suspend mode 1116 is a total power down: the battery is electrically disconnected from the rest of the system. Only HVAC power or USB power can wake up the device from shutdown. Below is a more organized description of each low-power mode. Note that the power saving levels 0,1 and 2 described with respect to FIG. 6 correspond to operating in the awake and sleep modes 1120 and 1110. Power saving level 3 corresponds to the halt mode 1112. According to some embodiments, when the thermostat is in the halt mode 1112 and Vcc_main disconnect mode 1114, the HVAC system is not controlled by the thermostat in order to conserve battery power. However, according to some embodiments, basic HVAC system control can be maintained either of these modes 1112 or 1114. For example, during the halt mode 1112, the backplate can be programmed to maintain a certain temperature while consuming very little power. According to another example, the backplate is able to implement a basic program schedule of set points, or the most recently adopted program schedule, while in halt mode 1112. According to another example, the backplate can be configured to maintain a hardcoded "safety temperature" range, such as between 45 degrees F. (to avoid freezing pipes, for example) and 95 degrees F. (to avoid damage to sensitive electrical equipment, for example).

FIG. 12 describes further detail of the head unit in normal operation modes, according to some embodiments. The head unit, in this example has three modes of operation: awake mode 1210, background mode 1212 and sleep mode 1214. As shown, there is an intermediate "background" mode, where the display is not active, but the head unit processor has power and operates at a medium level of activity. Examples of background operation include controlling HVAC functions, processing self-learning algorithms, communicating with the cloud, and detecting occupancy. Note that the power saving levels 0, 1 and 2 described with respect to FIG. 6 all operate in the three modes shown in FIG. 12, according to some embodiments.

Figures 13, 14:
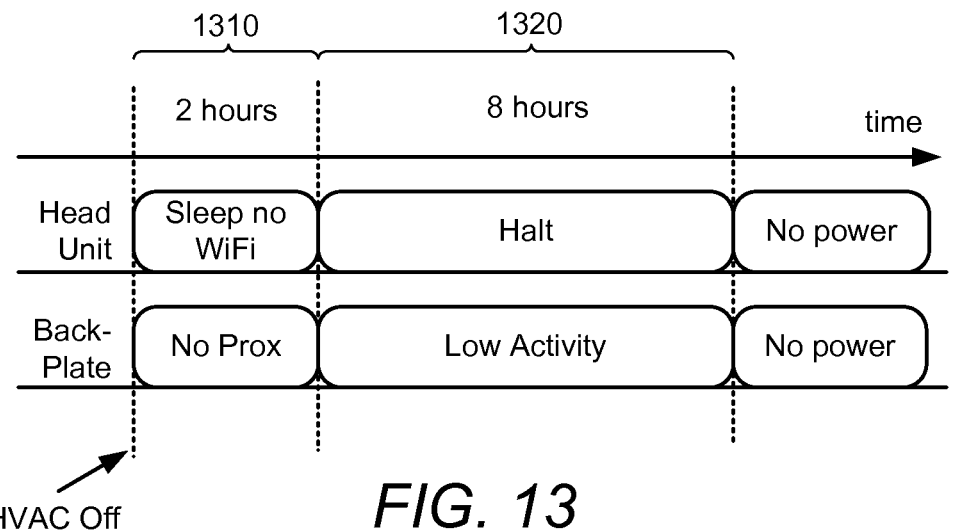
FIG. 13 is a timeline showing some low power modes for the head unit and backplate when HVAC-supplied electrical power is missing, according to some embodiments.
FIG. 14 is diagram describing aspects of the backplate involvement in preventing undesirable loops in head unit booting, according to some embodiments.

According to some embodiments the main head unit low power run-time management rotates around detected HVAC power present/missing events. FIG. 13 is a timeline showing some low power modes for head unit and backplate when HVAC power is removed, according to some embodiments. Preferably, every time the HVAC power is lost/recovered the backplate will send an unsolicited message to the head unit. Additionally, the head unit is able to request from the backplate the HVAC power state at any time. After the head unit receives a message that the HVAC power is lost, the head unit will sleep for a predetermined amount of time 1310, which in a preferred embodiment is 2 hours. Additionally, according to some embodiments, just prior to going to a sleep state, the head unit (1) displays a message such as "HVAC Power Lost" on the main screen; (2) communicates the event to the cloud (in case the local Wi-Fi service is still active); and (3) then shuts down Wi-Fi. To save power, according to some embodiments, the backplate does not perform proximity reading during this time. If after time 1310 in the sleep state the HVAC power has not recovered, the head unit commands a halt state (as described with respect to FIG. 11) for a predetermined time interval 1320, which in this example is 8 hours. During the interval 1320, the backplate processing operates at reduced activity to conserve battery power. According to some embodiments, if after the time 1310 in the sleep state the HVAC power is not recovered, the head unit will command a battery disconnect shutdown, skipping the halt state, and interval 1320, completely.

According to some preferred embodiments, there are exceptions to the timeline as described above and shown in FIG. 13. If, at any point in time, the $V_{batt}$ voltage drops below $V_{Ok\text{-}No\ HVAC}$, the head unit commands a shutdown (battery disconnect) immediately. The head unit displays a warning message as part of the shutdown such as "HVAC power lost— shutting down". If, at any point in time during the timeline, the user wakes the system up, the system will comply, and display a warning message such as "HVAC power lost."

If, at any point in time, HVAC power is recovered, the backplate will start charging the battery. If the head unit is currently in a sleep state (i.e. during interval 1310) the backplate will send an unsolicited message that will wake the unit up. According to some embodiments, Wi-Fi is also re-enabled and a message is sent to the cloud. If the system is in shutdown, the back plate will charge the battery up to $V_{boot}$ and then let the head unit boot.

The time intervals 1310 and 1320 are preferably selected based on (1) the likelihood of HVAC power becoming available again; (2) the battery charge remaining; and (3) the rate at which the battery charge is being depleted. It has been found in many cases that a temporary power interruption (i.e. a "black out") often do not last more than two hours which according to some embodiments is the length of interval 1310. According to some embodiments time periods are adjusted based on amount of voltage in battery, thereby implanting a sliding scale for the time intervals 1310 and 1320 wherein the intervals are shorter when $V_{batt}$ is lower. One example of such a sliding scale is: if $V_{batt}$ is fully or nearly fully charged then 1310 is 2 hours, and 1320 is 8 hours; if $V_{batt}$ is low, then 1310 is 30 minutes and 1320 is 1 hour; and if $V_{batt}$ is very low then 1310 is 2 minutes and 1320 is 20 minutes.

FIG. 14 is a diagram describing aspects of the backplate involvement in preventing undesirable loops in head unit booting, according to some embodiments. In low battery scenarios, if the head unit is allowed to boot as soon as the power management circuitry powers up the entire system, it has been found that the power rails will sometimes crash before reaching a fully booted state. If this happens, the system may enter an infinite reboot loop and it will never be able to boot successfully. Diagram 1410 illustrates a solution to this potential problem using the backplate. According to some embodiments, one or more other measures can be taken to reduce the risk of boot loops. Such measures include designing the head unit booting process to consume less power (e.g. by booting faster and/or lowering display brightness); and not starting Wi-Fi communication if the battery is below a predetermined voltage. According to some embodiments, the user is notified, or an indicator is displayed when the battery is very low but the backplate is letting it charge up, such as row 1412. According to some embodiments, a very low power consuming indicator, such as a red and/or green LED, such as LED 380 in FIG. 3A, is used to provide such indication without having to display a message using the backlit main display. According to some embodiments, such as in row 1414, a real-time-clock alarm can be set to wake up at a certain time (such as present time plus two hours), and then once back awake, the system can put itself into an even lower power mode.

An interruption of HVAC power can be due to a loss of HVAC power only (e.g. from a breaker trip), or a loss of all power in the dwelling (e.g. from a blackout or an intentional vacation home shutdown). According to some embodiments, measures can be taken to distinguish the nature of the electricity failure: (1) detect lack of voltage on any inserted wire; (2) look for Wi-Fi connectivity—no Wi-Fi network suggests full blackout; (3) try to distinguish short term blackout from long term, e.g. by waiting for a predetermined period of time (e.g. interval 1310); (4) try to distinguish one-time blackout from "rolling blackout" by comparing the length and intervals of repeated power interruptions; and (5) try to distinguish blackout from shut down house (e.g. vacation house) by waiting for a suitably long predetermined time (e.g. interval 1320).

Although the foregoing has been described in some detail for purposes of clarity, it will be apparent that certain changes and modifications may be made without departing from the principles thereof. It should be noted that there are many alternative ways of implementing both the processes and apparatuses described herein. By way of example, while am amount of electrical energy or charge remaining in the rechargeable battery can often be characterized to a reasonably accurate degree by its terminal voltage, and therefore many of the above-described charge state characterizations, limits, thresholds, and so forth are stated directly in volts, it is to be appreciated that any of a variety of different representations of energy or charge levels remaining in the rechargeable battery can be used instead of volts without departing from the scope of the present teachings, based on any of a variety of different tests or measurements representative of battery charge/energy or from which such values can be computed. Accordingly, the present embodiments are to be considered as illustrative and not restrictive, and the inventive body of work is not to be limited to the details given herein, which may be modified within the scope and equivalents of the appended claims.

What is claimed is:

1. A method for strategically reducing power usage in a thermostat having a rechargeable battery comprising:
   supplying power for a plurality of thermostat activities using a rechargeable battery located within the thermostat;
   making at least one measurement associated with the rechargeable battery; and
   automatically altering one or more of the thermostat activities based at least in part on the measurement so as to reduce power usage from the rechargeable battery, wherein:
   the one or more thermostat activities continues to operate in a reduced-power mode; and
   the one or more thermostat activities comprise:
   sensing from a plurality of sensors;
   wireless communications;
   operation of one or more learning algorithms; or
   operating an HVAC system.

2. A method according to claim 1 further comprising harvesting power from an HVAC system being at least partially controlled by the thermostat, the harvested power being used at least in part to charge the rechargeable battery.

3. A method according to claim 1 wherein the altering of the one or more of the thermostat activities is carried out in a progression of stages in which each stage is associated with altering a predetermined set activities, and the stages are progressed based at least in part on the measurement associated with the rechargeable battery.

4. A method according to claim 3 wherein between three and six stages are used ranging between nearly fully charged battery and nearly drained battery.

5. A method according to claim 1 wherein each of the one or more thermostat activities is altered depending on a predetermined threshold for that activity.

6. A method according to claim 1 wherein the measurement associated with the rechargeable battery includes a measure of remaining battery charge level.

7. A method according to claim 6 wherein the measurement is battery voltage.

8. A method according to claim 1 further comprising estimating remaining battery capacity based in part on current activities being carried out by the thermostat, wherein the altering is based at least in part on the estimated remaining battery capacity.

9. A method according to claim 1 further comprising estimating remaining battery capacity based in part on a measurement of power being drawn from the battery, wherein the altering is based at least in part on the estimated remaining battery capacity.

10. A method according to claim 1 wherein the altering of one or more of the thermostat activities includes reducing a backlighting level of a display of the thermostat.

11. A method according to claim 1 wherein the altering of one or more of the thermostat activities includes altering wireless communications being used by the thermostat.

12. A method according to claim 1 wherein the altering of one or more of the thermostat activities includes altering a frequency at which a measurement is made with a sensor.

13. A method according to claim 1 wherein the altering of one or more of the thermostat activities includes altering the operation of one or more learning algorithms being carried out by the thermostat.

14. A method according to claim 1 wherein the altering of one or more of the thermostat activities includes altering the operation of aspects of a user interface.

15. A method according to claim 1 wherein the altering of one or more of the thermostat activities includes, in an HVAC system having more than one stage of heating or cooling, disabling one or more of the stages.

16. A method according to claim 1 further comprising attempting to notify a user that the available power within the thermostat is being depleted.

17. A method according to claim 16 wherein the attempt to notify includes wirelessly transmitting a message to a computing device.

18. A method according to claim 17 wherein the attempt to notify includes displaying a notification on a display of the thermostat.

19. A thermostat comprising a processing system and other components adapted and arranged to carry out a method according to claim 1.

20. A thermostat comprising:
a plurality of components that consume electrical power;
a rechargeable battery for providing power to at least some of the plurality of components; and
a processing system adapted and programmed to automatically alter thermostat functionality so as to reduce power usage based at least in part on a measurement associated with the rechargeable battery, wherein:
the one or more thermostat activities continues to operate in a reduced-power mode; and
the one or more thermostat activities comprise:
sensing from a plurality of sensors;
wireless communications;
operation of one or more learning algorithms; or
operating an HVAC system.

21. A thermostat according to claim 20 wherein the plurality of components includes a plurality of sensors, and one or more systems for wireless communication.

22. A thermostat according to claim 20 further comprising power harvesting circuitry adapted to harvest power from an HVAC system for use in charging the rechargeable battery.

23. A method for reducing power usage in a thermostat having rechargeable battery comprising:
supplying power for a plurality of thermostat activities using a rechargeable battery located within the thermostat, the rechargeable battery being ordinarily recharged using power from an external power source;
detecting an lack of power from the external power source; and
automatically altering one or more of the thermostat activities based at least in part on the detecting of the lack of power from the external source, so as to reduce power usage from the rechargeable battery.

24. A method according to claim 23 further comprising making at least one measurement associated with the rechargeable battery, wherein the automatic altering is based in part on the measurement.

25. A method according to claim 24 wherein the measurement is battery voltage.

26. A method according to claim 23 wherein the thermostat activities are maintained in a reduced state for a first predetermined amount of time following the detecting of the lack of external power, unless an external power source suitable for recharging the battery is detected.

27. A method according to claim 23 further comprising disconnecting the rechargeable battery from at least a portion of electronics within the thermostat so as to conserve power within the rechargeable battery.

28. A method according to claim 23 wherein the automatic altering includes shutting down at least one processing system within the thermostat.

29. A method according to claim 28 further comprising booting up the at least one processing system that had been shut down, when an external power source suitable for recharging the battery is detected and the battery is charged above a predetermined level.

30. A method according to claim 23 further comprising attempting to notify a user that of the detected lack of external power.

31. A thermostat comprising a processing system and other components adapted and arranged to carry out a method according to claim 23.

* * * * *